United States Patent [19]
Heard et al.

[11] 3,810,174
[45] May 7, 1974

[54] DIGITAL SCAN CONVERTER

[75] Inventors: James L. Heard; William C. Hoffman, both of Torrance; Eugene W. Opittek, Tustin, all of Calif.

[73] Assignee: Hughes Aircraft Company, Culver City, Calif.

[22] Filed: Nov. 28, 1969

[21] Appl. No.: 880,630

[52] U.S. Cl. ............... 343/5 DP, 178/DIG. 22, 178/DIG. 24, 343/5 SC
[51] Int. Cl. ........................ G01s 7/44, G01s 9/02
[58] Field of Search ............. 178/DIG. 22, DIG. 24; 343/5 DP, 5 SC

[56] References Cited
UNITED STATES PATENTS

| | | | |
|---|---|---|---|
| 3,528,069 | 9/1970 | Mondon | 343/5 DP |
| 3,388,377 | 6/1968 | Folsom et al. | 343/5 DP |
| 3,218,637 | 11/1965 | Balding | 343/5 SC |
| 3,147,474 | 9/1964 | Kliman | 343/5 SC |
| 3,408,647 | 10/1968 | Dynan et al. | 343/5 SC |

FOREIGN PATENTS OR APPLICATIONS 1,198,872  8/1965  Germany

OTHER PUBLICATIONS

"Digital Frequency Band Compressor For Radar Signals" by W. H. Schonfeld et al., Nachrichtentechnische Zeitschrift, Vol. 19, No. 6, June 1966, A report from the Institute for High Frequency Technology of the Hanover Technological Institute, pp. 1–25.

Primary Examiner—Malcolm F. Hubler
Attorney, Agent, or Firm—James K. Haskell; Walter J. Adam

[57] ABSTRACT

A digital system is disclosed for conversion of data rates inherent in various scanning patterns to different rates for display. A buffer memory is employed to accumulate blocks of data pertaining to successive scanning lines in a rectilinear or polar coordinate scanning pattern. The data is transferred in blocks to a bulk storage memory from which it is read cyclically for display. Different scanning and display patterns are accommodated through mode control switches. In multi-bar-elevation radar scanning modes, detection of targets is augmented by storing for simultaneous display a plurality of past frame histories or by storing an intensity value in binary code for a target return and decreasing it in uniform steps during successive scanning cycles during which a target return is not received from the same range element until it reaches a level of zero.

28 Claims, 16 Drawing Figures

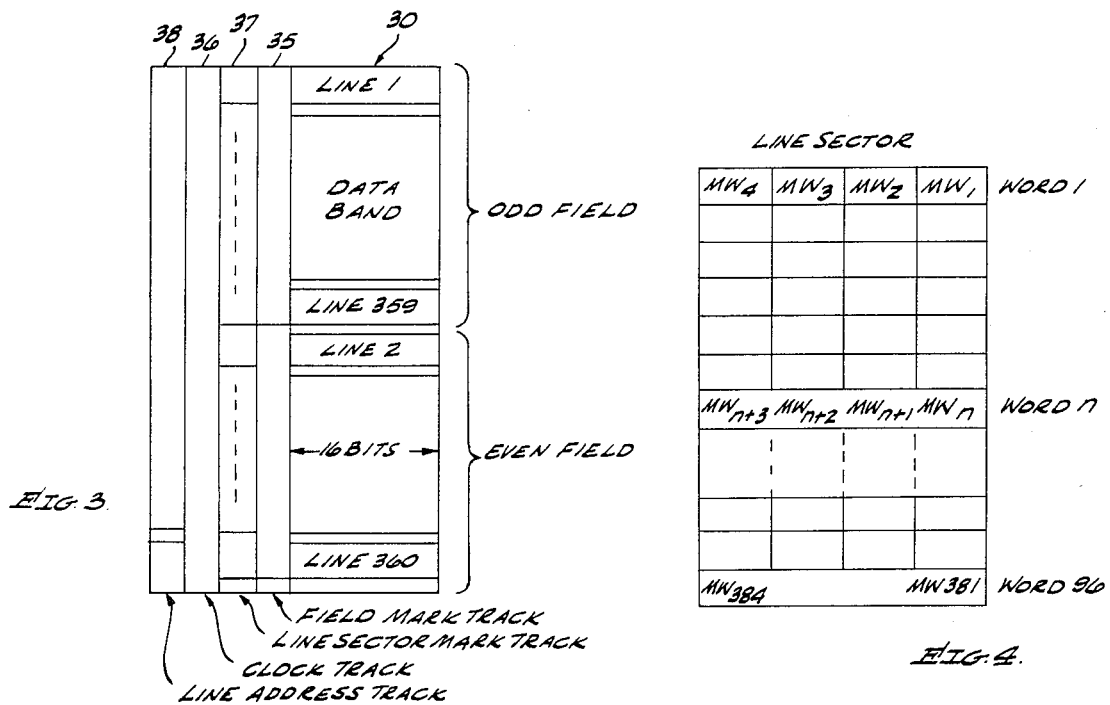
Fig. 3.
FIELD MARK TRACK
LINE SECTOR MARK TRACK
CLOCK TRACK
LINE ADDRESS TRACK
Fig. 4.
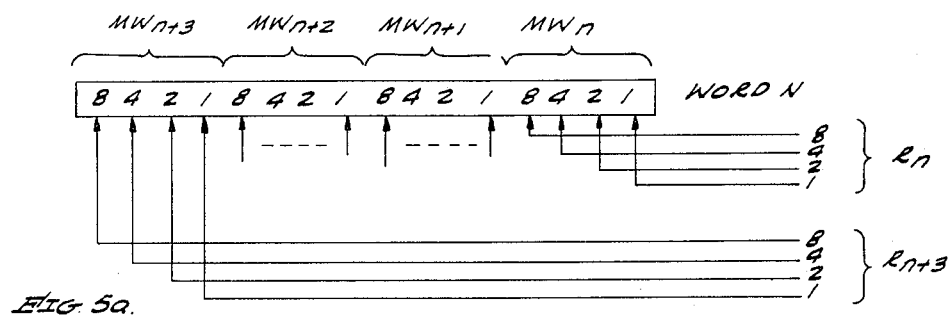
Fig. 5a.
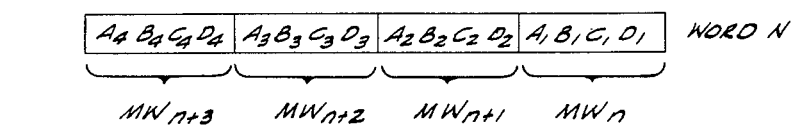
Fig. 5b.

DIGITAL SCAN CONVERTER

BACKGROUND OF THE INVENTION

This invention relates to apparatus for conversion of video data which is available at one particular rate and must be displayed at a different rate, and particularly, to such apparatus having different modes of scanning and display.

The basic requirement of a scan converter is to accept video data as it becomes available at one particular rate and to display the data at a different rate. In the past, analog storage tubes have been used for conversion of slow data rates, such as radar scan data rates, to high data rates, such as those used for flicker-free television display. The technique employed is to store a charge pattern at the sensor scan rate on a dielectric mesh of a cathode ray tube, and to use the charged dielectric mesh to modulate a read beam scanned at a higher rate in the proper format for display on a second cathode ray tube. The modulated read beam develops a video signal in a collector mesh, and the video signal is used to modulate the electron beam of the display tube as that beam is scanned in synchronism with the read beam of the scan converter tube. The format selected for display may include interlaced scanning as in conventional television for better flicker-free display.

Many different types of scan converters have been developed using this straight-forward conversion technique using analog signal storage for the video data. While such analog scan converters have been used successfully, they do have their disadvantages and limitations. For example, video intensity compensation is required when changing modes of operation, such as from a B-scan to a PPI-scan, and the analog signal storage tube provides only a limited storage time. It would be desirable to have a scan converter that possesses all of the advantages of the analog tube type, such as the ability to convert any one of a selected number of different sensor scan patterns to a television type interlaced scan, but with increased reliability, storage time and capability of precisely specifying the location of bits of stored data, and with a smaller number of operational adjustments, less temperature sensitivity, a higher level of video signal applied to the display device, and more uniform presentation of data in the display device.

SUMMARY OF THE INVENTION

In accordance with the present invention, a digital scan cnverter is provided using a sufficiently large bulk storage memory from which video data stored in one format may be read in a different format for display. A buffer memory is provided at the input of the bulk storage memory in order to receive video return signals though an analog-to-digital signal converter and store in the bulk storage memory accumulated memory data in digital form.

The buffer memory is provided with sensor data coordinates in order that the quantized video data may be accumulated for transfer into the bulk storage memory in block form such as all data pertaining to a particular point on the axis of abscissas for a rectilinear coordinate system of scanning, or all data pertaining to a particular angle for a polar coordinate system of scanning. The data thus stored in the bulk storage memory may be read for display in blocks, each block pertaining to one line of display which may correspond to a line scanned along the ordinate axis of a rectilinear scanning system or vector of a polar coordinate scanning system.

The data read from the bulk storage memory need not be in the order in which it was developed through the scanning sensor. Instead, it may be read in any desired order such as in two fields, a first field consisting of successive odd numbered blocks pertaining to odd numbered scan lines and a second field consisting of even numbered blocks pertaining to even numbered scan lines for interlaced display.

In its broadest aspects, the buffer and bulk storage memories may be combined into one storage memory such that the input line data is stored therein directly with the data elements of a given line stored in the order in which read as the storage memory is cyclically read, or in an order effectively orthogonal thereto such that corresponding elements of all lines are read in sequence for display in one line orthogonal to the direction in which a line block of data is displayed in a display frame. In either case, a line block of data need not include a data element for each video return. Instead, a predetermined number of data elements may be averaged for storage and display as a single element of data. Similarly, a line block of data need not be stored for each line scanned. Instead, a predetermined number of line blocks of data may be averaged for storage and display as a single element.

For bar-elevation scanning, as with air-to-air radar, the digital video data is accumulated in the buffer memory and stored in the bulk storage memory in accordance with its source not only as to azimuth (scan line) but also as to its elevation (scan plane) so that a selected plane may be read from the bulk storage memory for display. In order that the bar-elevation bulk storage and display be compatible with the bulk storage and disply systems of other scan conversion patterns, n planes of data are stored in the same bulk storage memory space used to store one plane of data for other scan patterns. That is done by storing only an nth the number of scan lines for each plane which may result in some sacrifice in resolution.

For air-to-air scanning modes, such as the bar-elevation mode, the video return signal is quantized or digitized into a 1-bit number representing the video return from each range interval, whereas for other display patterns, the video data is quantized into $n$-bit numbers, each number representing one of $2^n$ video amplitude levels. Accordingly, only $1/n$th the number of memory cells is required to store the video return data from a given range interval. The remaining memory can be used in the bar-elevation scan converting mode to store additional planes of radar return data with a predetermined resolution. By repeatedly updating the planes in sequence, and storing each line of data as it is accumulated in every nth line of bulk memory, n past frames may be displayed to augment the digital display of targets since a true target will produce a cluster of n target returns whereas random false alarms are stored and displayed randomly. Also, the orientation of the target returns of a cluster with respect to each other will give an indication of the direction and rate of motion of the target relative to the sensor.

If the bulk storage memory is organized for bar-elevation scan conversion such that no resolution need be sacrificed, n past frames cannot be stored unless the bulk storage memory is expanded by a factor of $n$.

However, for a digitally augmented display system which does not require a sacrifice in resolution and only requires expansion of the bulk storage memory by a factor of two, each new bit of data may be compared with stored data from a corresponding azimuth and elevation of a previously stored frame and stored as a two-bit code according to the following system. If a new bit is a binary one representing a hit (target return), a two-bit code having a bit-one in each position is stored; and if the new bit is a binary zero, a binary one is subtracted from the binary number represented by the stored two-bit code unless the two-bit code has a value of zero. In each case, the resulting two-bit code (binary number) is stored in the bulk storage memory and cyclically read for display through a digital-to-analog converter in order that the video signal transmitted to the cathode ray tube then be quantized to four levels, a maximum representing a new hit, a minimum (zero) representing no hits for three successive scans, and intermediate levels for one and two successive scans without a hit. As the position of the target relative to the sensor changes, new hits will occur at different coordinate positions of the scan with the result that the display will be a cluster of target returns of varying intensity such that the direction in which the intensity is increasing will give an indication of the direction and rate of motion of the target relative to the sensor.

BRIEF DESCRIPTION OF THE DRAWINGS

FIG. 3 illustrates schematically the organization of data in 16 parallel tracks of a recirculating bulk memory, such as a magnetic disc or drum memory having separate tracks for the storage of synchronizing signals.

FIG. 4 illustrates the organization of a line block of data in 96 word bins (addresses) of the 16 parallel data tracks shown in FIG. 3.

FIG. 5 illustrates two formats for data stored in a given word bin, in one case for video return data quantized into 16 binary coded levels for each of four range intervals and in the other for video data quantized into two binary coded levels for each of four range intervals for separate bar elevations A, B, C and D of a bar-elevation scan pattern.

DESCRIPTION OF THE PREFERRED EMBODIMENTS

Figure 1:
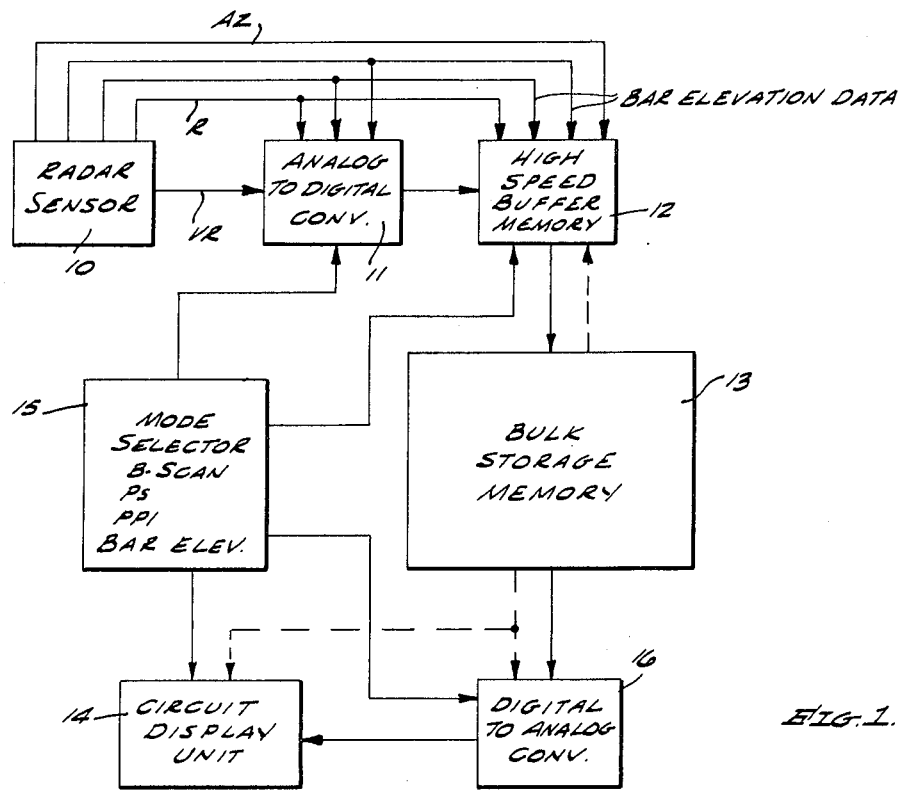
FIG. 1 is a general block diagram of a digital scan converter illustrating the present invention.

Although specific embodiment of the present invention will now be described with reference to the drawings, it should be understood that such embodiments are by way of example only, and not by way of limitation, and that the braod scope of the invention is defined in the appended claims. In FIG. 1, a multi-mode radar transmitter receiver 10 transmits video return (VR) signals to an analog-to-digital converter 11 which produces digital output signals for successive ranges of each azimuth as the radar transmitter-receiver scans at a slow rate. Each range element thus provides a data element of either one or $n$ bits, where $n$ is arbitrarily selected to be four for a 16-level display.

A high speed buffer memory 12 is provided to accumulate quantized data pertaining to a given azimuth, which may be referred to as a scan line, until a full line of data is accumulated and a preassigned area is available in a bulk storage memory 13 for the entry of the accumulated line of data.

Although a drum memory is employed in the specific embodiments to be described by way of example any type of bulk digital storage may be employed, such as disc memory or other type of recirculating memory, or some type of random access memory, such as a core or solid state memory. All that is required is that the bulk memory be capable of operating at a sufficiently high rate as to repeatedly display a frame of data for flicker-free viewing. The high speed buffer memory 12 accumulates one or more lines of data at the slow scan rate of video return from the radar transmitter-receiver 10 without interruption of the display process except for the occasional interruption of a given line of display while newly accumulated data is being stored in the bulk storage memory 13. A cathode ray tube (CRT) unit 14 is employed for the display, but it should be understood that other display devices may be employed, such as a matrix of electroluminescent cells which can be individually energized by data elements.

The radar transmitter-receiver 10 transmits to the high-speed buffer memory 12 range and azimuth information, in addition to bar-elevation data, in order that a given line of data being accumulated be properly stored as to azimuth and range, and in the case of bar-elevation scan conversion, the plane currently being scanned. A mode selector 15 is provided to convert operation of the high-speed buffer memory 12 and a digital-to-analog converter 16 from a given mode to another mode of operation. The modes included for illustration are the B-scan mode, a side-looking radar mode (sometimes referred to herein as the "passing scene mode"), a PPI mode, and a bar-elevation mode.

Timing and control generation is required to synchronize the operations of accepting video return data in the analog-to-digital converter 11, controlling and addressing the high-speed buffer memory 12, controlling and addressing the bulk storage memory 13 and processing data in the digital-to-analg converter 16. As noted herebefore, data is cyclically read from the bulk storage memory 13 for continuous display. The read-out operation is interrupted by the high-speed buffer memory 12 only when a line block of data is being transferred to the bulk storage memory 13. Read-out of the bulk storage memory 13, data processing in the digital-to-analog converter 16 and display in the CRT unit 14 is timed and controlled by the timing and control portion of the bulk storage memory 13 as represented by a dotted line.

The analog-to-ditial converter 11 is synchronized and controlled by range synchronizing signals (R), and bar-elevation data. The high-speed buffer memory 12 is timed and controlled by the range signals, the bar-elevation data and an azimuth signal (AZ) from the radar transmitter-receiver 10. During a block transfer operation of line data from the high speed buffer memory 12 to the bulk storage memory 13, the high-speed buffer memory is also timed and controlled by the bulk storage memory 13 as represented by a dotted line. Since the timing and control signals between the high-speed buffer memory and the bulk storage memory are generally conventional and will vary in detail from one system to the next depending upon techniques selected to implement the high-speed buffer memory 12 and the bulk storage memory 13, the timing and control signals are not shown in FIG. 1; they are shown and will be described only with reference to the specific illustrative embodiment of the present invention with reference to FIGS. 6 and 9.

The digital-to-analog converter 16 is timed and controlled by the bulk storage memory 13 as noted hereinbefore. Its mode of operation is always the same, namely, to receive data being read-out from the bulk storage memory and to convert it to analog signals for display. However, conversion will take two forms depending upon whether or not the system is in the bar-elevation mode.

Figure 8:
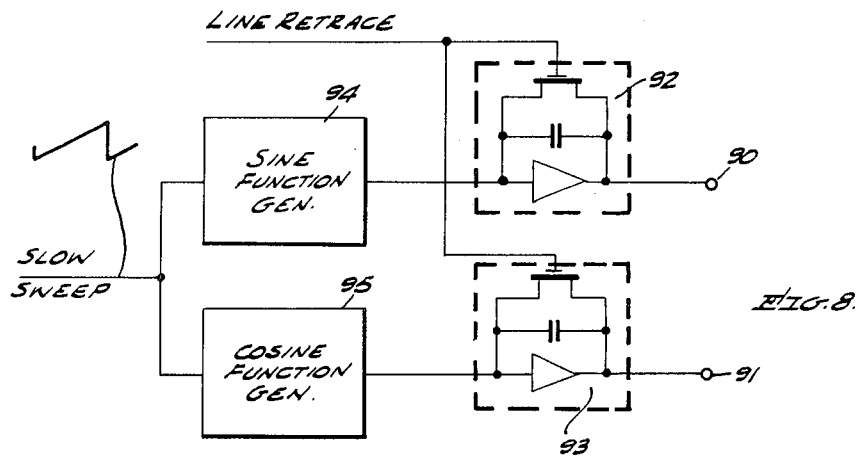
FIG. 8 illustrates schematically the manner in which sweep control signals may be generated for the horizontal (X) and vertical (Y) axis of a cathode ray tube display for a PPI scan mode.

The cathode ray tube unit always generates fast and slow sweeps for the beam deflection system, but the fast and slow sweeps are applied to the horizontal (X) and vertical (Y) deflection systems in one of two possible orders, depending upon the scan converting mode selected, except for PPI display. In the case of a PPI display the slow sweep is applied to both the horizontal and the vertical deflection systems through sine and cosine function generators followed by separate line synchronized integrators, as will be more fully described hereinafter with reference to FIG. 8.

Figure 2A:
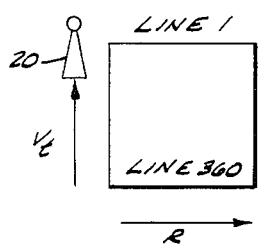
FIGS. 2a to 2d illustrate four different radar scan patterns which may be accommodated for slow to fast scan conversion by the system of FIG. 1.

FIGS. 2a through 2d illustrate various scan conversion modes or, from the display point of view, various display formats. In FIG. 2a, there is a side-locking radar display format to display a passing scene (ground map) using a radar transmitter-receiver moving at a velocity Vt in the direction indicated by the arrow of a symbol 20 but looking 90° to the right. This information stored in the bulk storage memory is so continuously up-dated as to provide an entire new scene with 360 lines of display every so many seconds, each line comprising 384 range elements. The rate at which the scene is up-dated is proportional to aircraft velocity. The video return from each range element is quantized to a 4-bit number for 16 levels of display intensity.

Figure 2B:
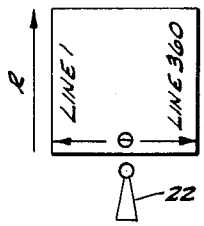

FIG. 2b illustrates a B-scan display format which is an air-to-air mode that does not require 16 levels of intensity display. Accordingly, for the B-scan mode, the analog-to-digital converter 11 is modified to provide two-level (hit or miss) quantization. That is readily accomplished by changing the gain of an operational amplifier at the input of the analog-to-ditial converter in response to a mode control signal $\overline{MC_2}$ to cause the amplifier to saturate when the video return signal reaches a minimum level required for the lowest level of intensity of a 16-level quantization. In that manner, the analog-to-digital converter 11 will provide a four-bit code representative of the highest level of video return for any valid video return. Accordingly, any video return in the B-scan mode is stored and ultimately displayed at the maximum level of intensity. Otherwise, the B-scan mode is similar to the "passing scene" mode except that the radar azimuth position is substituted for the position data Vt in the rectangular coordinate system or storing and displaying data. The B-scan also differs in that the fast sweep for the CRT unit 14 is applied to the horizontal axis in the cgse of the "passing scene" mode and to the vertical axis in the case of the B-scan mode.

In some air-to-air radar systems, a digital processor will provide a 1-bit vide return signal. Accordingly, when the present invention is adapted for use with such systems in an air-to-air scanning mode, a binary 1 may be directly translated into the binary number 111, and a binary 0 into the 4-bit binary number 0000 by a code converter in place of a modified analog-to-digital converter.

Figure 2C:
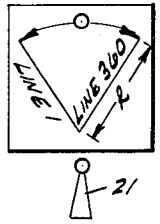

FIG. 2c illustrates a PPI-display which is similar to the b-scan display of FIG. 2 except that a PPI display is generally a ground mapping mode and not an air-to-air mode so that the mode signal $\overline{MC_2}$ would not be energized (true) and the analog-to-digital converter 11 would provide 16 levels of quantization as in the case of the "passing scene" mode. Otherwise, the data is stored in the bulk storage memory 13 and cyclically read out for display just as in the B-scan mode, while that the CRT unit 14 is driven by sine and cosine modulated sweep signals in order that the origin of each line remain fixed at a point representing the position of the radar looking out in the direction of the arrow of a symbol 21.

In the B-scan mode, the radar is looking out in the same direction as for the PPI scan as indicated by the arrow of a symbol 22 but the video returns for the B-scan are all samples of range elements at a sufficiently great distance from the radar, and from a sufficiently small area, as to be able to display the video return in a rectangular coordinate system without any distortion as might occur if the PPI data were to be displayed in the B-scan format. In that regard, it should be noted that provision is made for controlling the cathode ray tube 14 by mode control switches independent of mode control switches for the high-speed buffer memory 12 in order that PPI data may be displayed in the B-scan format if desired.

Figure 2D:
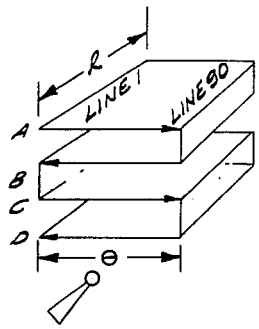
Figure 6:
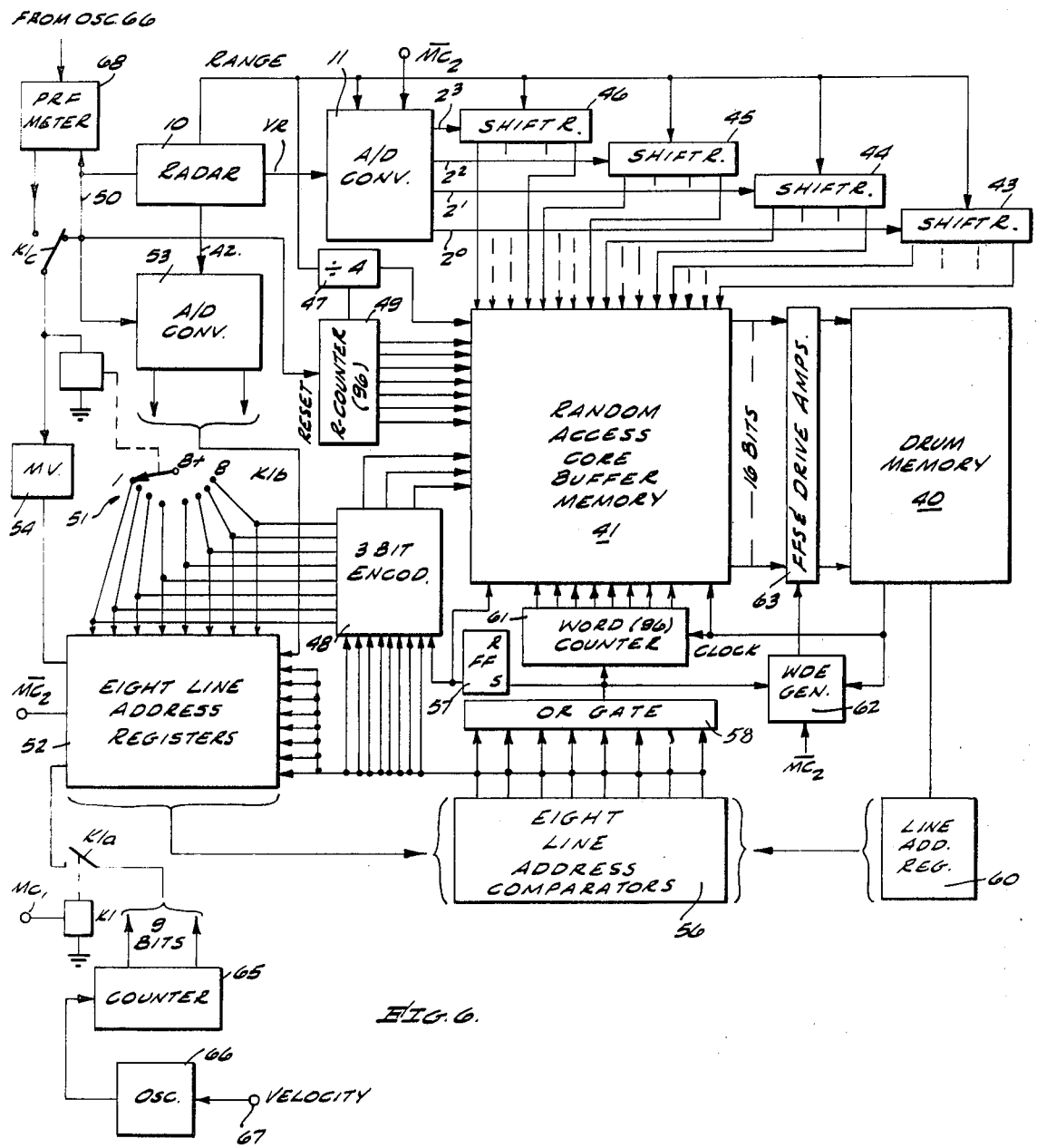
FIG. 6 is a block diagram of an illustrative embodiment of the present invention for accumulating and storing quantized video for B-scan, PPI and passing scene scans such as side-looking radar.
Figure 7:
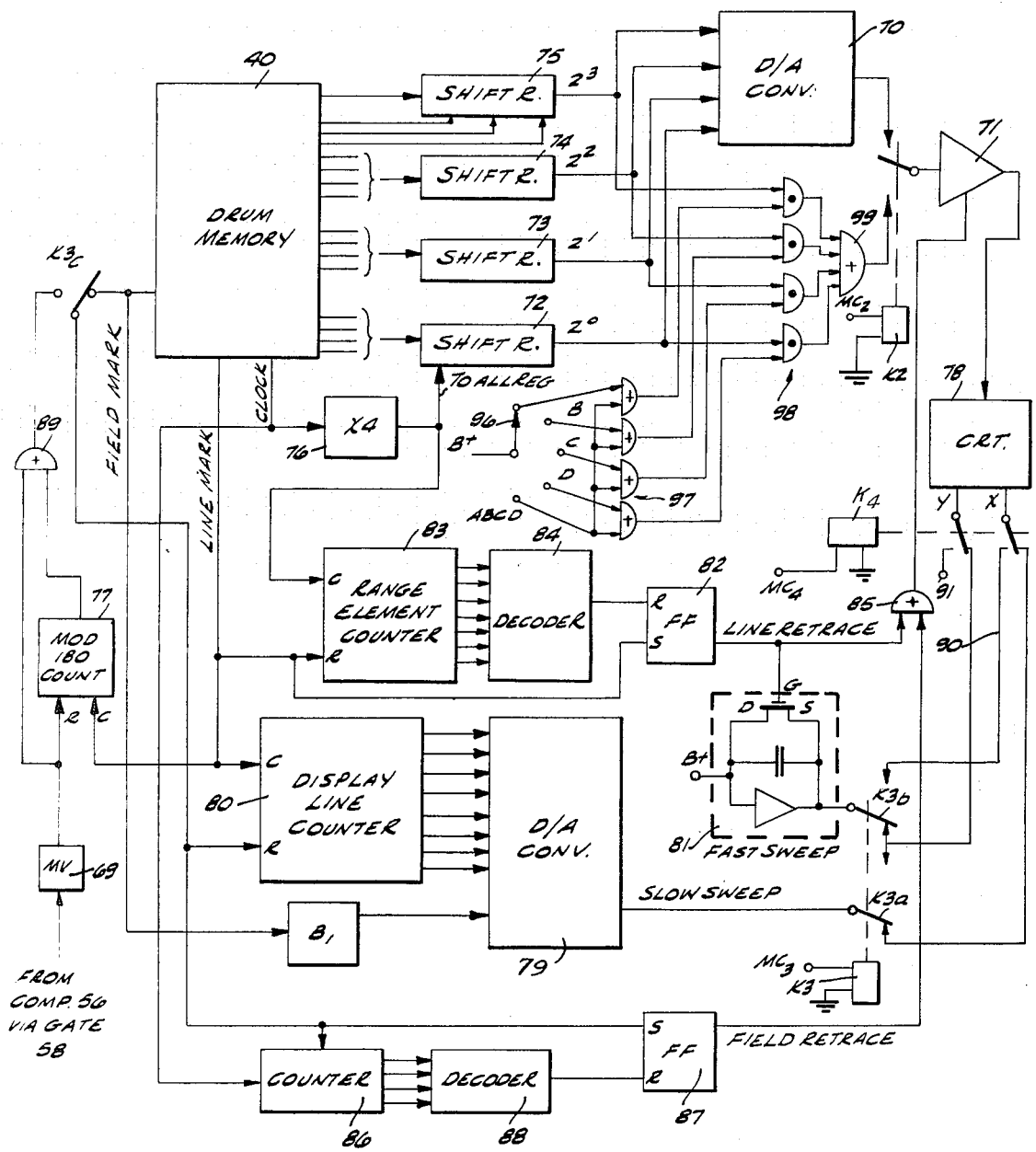
FIG. 7 is a block diagram of an illustrative implementation of the present invention for cyclically reading and displaying on a cathode ray tube quantized data digitally stored by the system of FIG. 6 for all the scan modes of the system of FIG. 6 and a bar-elevation scan mode.

FIG. 2d illustrates a bar-elevation scanning mode which is like the B-scan mode of FIG. 2b except that after having scanned the first plane A, the radar antenna is stepped down in elevation for a return scan in the plane B. After scanning the plane B, the antenna is further depressed in elevation to scan across again in another plane C, and finally, the antenna is depressed again to still another elevation for scanning the last plane D. More planes may be scanned for a total of typically eight, but four illustrates the bar-elevation mode and, for the specific embodiment illustrated in FIGS. 6 and 7, represents the optimum number for most efficient utilization of bulk storage memory capacity. That embodiment provides for display of any one of the four planes or all of the planes simultaneously.

The embodiment of FIGS. 6 and 7 also provides digitally augmented detection of targets in the bar-elevation mode by causing four past frames of a given plane to be displayed at one time, the corresponding azimuth of each frame being displayed on four adjacent vertical lines of the cathode ray tube. A true target will then present a cluster of video returns, whereas noise signals will occur and be displayed randomly. Another advantage of this digitally augmented detection of targets is that the relative position of the target from one frame to the next of the four frames displayed simultaneously will give an indication of the direction and rate of relative motion between the target and the radar transmitter-receiver. Another system for digital augmentation of target detection will be described with reference to FIGS. 10 and 11 for an eight-bar-elevation scan.

The bulk storage memory 13 is cyclically read to continuously display on the CRT unit 14 continuously updated data received by the radar transmitter-receiver 10. Accordingly, it is convenient to implement the bulk storage memory 13 with a conventional magnetic disc or drum memory, or some other form of recirculating memory, but it should be understood that a random access memory may be employed to equal advantages, such as a magnetic core memory or any other form of randomly addressable memory.

In the illustrative embodiments to be described, a drum memory is employed for bulk memory on 16 parallel data tracks. Separate tracks are provided for synchronizing signals in a conventional manner. FIG. 3 illustrates schematically the organization of data and synchronizing signals on the drum. Information is written on the data tracks 30 of the drum in increments of "one line" blocks consisting of 384 range elements, each element comprising a 4-bit number (microword) for specifying 16 levels of a video signal to be displayed for each of the scanning patterns illustrated in FIGS. 2a, 2b and 2c. For the scanning pattern illustrated in FIG. 2d, each four-bit group (referred to hereinbefore as a microword) is used to store target data from four different bar-elevation planes. Thus, one line sector of the 16 parallel data tracks 30 will include 384 microwords arranged in microwords to form 96 words as illustrated in FIG. 4. Accordingly, each word stored in and read from the drum memory will consist of 16 bits, but upon reading from the drum memory, the bits of a word are processed in groups of four.

FIG. 5a illustrates schematically the arrangement of the 16 bits of a given word N, where N is a number from 1 to 96. The first microword $MW_n$ includes the four bits of target data from the range element $R_n$ while the microword $MW_{n+3}$ includes the four bits of target data from the range element $R_{n+3}$. The bits of the microwords $MW_{n+1}$ and $MW_{n+2}$ are therefore comprised of four bits of target data from range elements $R_{n+1}$ and $R_{n+2}$, respectively.

A given word N comprises similar four-bit microwords $MW_n$ through $MW_{n+3}$ of a four-bar-elevation scan pattern, just as for the other scan patterns, but with the binary digits of a given microword, such as the microword $MW_{n+2}$ assigned to target data from corresponding range elements of four successive planes. Accordingly, while scanning in the bar-elevation plane as shown in FIG. 2d, the target data from four successive range elements on a given line (at a given azimuth) are stored in bit positions $A_1$ through $A_4$ of the microwords $MW_n$ to $MW_{n+3}$. The remaining bit positions of microwords $MW_n$ to $MW_{n+3}$. The remaining bit positions of microwords $MW_n$ to $MW_{n+3}$ remain unaltered while scanning the plane A. Thereafter, while scanning the plane B target data from corresponding range elements in the plane B are stored in bit positions $B_1$ through $B_4$ while the other bit positions are left unaltered. Target data are similarly stored in the microwords while scanning the remaining two planes of a four-bar-elevation scan pattern.

Referring back to FIG. 3, each block of line data in a sector of the data band is followed by a block of 12 words schematically illustrated as a shaded sector of the data band in order to allow time for the electron beam of the CRT unit 14 (FIG. 1) to retrace after the preceding line of data has been read out for display on one line or raster. Accordingly, video data is not stored in those blocks which may be referred to as retrace blocks; however, these blocks are available for storage of drum self-clocking preface bits.

For flicker-free display of the data on the CRT unti 14, the lines of data are stored in two half drum sectors, the odd numbered lines in one half drum sector which may be referred to as the odd field and the even numbered lines in the other half drum sector which may be referred to as the even field. In that manner, the data is cyclically read for display in an interlaced manner by displaying first the lines of the odd field and then displaying the lines of the even field on rasters spaced between the display rasters of the odd field.

In order to control the slow sweep of the CRT unit 14 such that the even field rasters are displaced from the odd field rasters by half the space between the rasters, a pulse is permanently stored as a field marker in a separate track 35 at the end of the odd field and the end of the even field, preferably in a position for the field marker pulses to be read during the next clock period following the last word read from the line 359 and the last word read from the line 360. The clock periods are defined by clock pulses stored on still another track 36. The drum is rotated at a rate which will allow a complete frame comprising the odd and even fields of data to be displayed at a rate sufficiently high to provide flicker-free viewing.

To synchronize the electron beam retrace of the CRT unit 14, pulses are stored on still another track 37, one pulse for each line retrace block in the data band 30. Each line sector mark pulse thus stored is read during the first clock period of the retrace block.

Line addresses are serially stored in yet another track 38 in sectors which are read during the line retrace periods, preferably during the first nine clock periods. Since nine binary digits are required to define one of 360 lines by a binary number, reading a line address during the first nine clock periods of a line retrace block will allow three clock periods to determine whether a line of data should be transferred from the high speed buffer memory 12 into the bulk storage memory 13. If not, the next line is automatically read and displayed.

It should be noted that although the format illustrated for the magnetic drum memory in FIG. 3 divides the data band into two sectors, one for the odd field and one for the even field other arrangements are possible depending upon the diameter of the drum for a given bit density. For example, if a smaller drum is employed, the data may be divided into two data bands, one for the odd field and one for the even field. A single index pulse would then serve as a field marker which would alternately enable 16 of 32 read-write heads under control of a flip-flop set and reset by the index pulse. Each line address would then require only eight binary digits for 360 lines of data stored on a single track if the flip-flop set and reset by the index pulse is employed as the least significant binary digit of the address of a given line while addressing the bulk storage memory 13 for the purpose of transferring a block (line) of data from the high speed buffer memory 12. Still another possibility for an even smaller drum diameter is to provide three data bands such that the last part of the odd field and the first part of the even field is stored in a second band while the first and last parts of the odd and even fields are stored in the first and third bands respectively. Separate address tracks should then be provided for each data band and an index pulse counted to successively enable not only three banks of read-write heads, 16 heads per band, but also to successively enable three read heads, one for each of three line address tracks.

Dividing the video data into two fields provides a two-to-one interlace in the display. For some applications it may be desirable to provide a four-to-one interlace. That may be readily accomplished by dividing the data into four fields instead of two, and reading out the data from the fields in sequence.

If another type of bulk storage memory is employed, such as a core memory or an integrated circuit memory addressable like a core memory, (or MOS shift registers employed as a recirculating memory), clock generators in the form of counters driven by a master clock may be employed in place of the field and line mark tracks with two separate counters for addressing, one to distinguish between odd and even fields and the other to distinguish between separate lines (blocks) of data for each field. Still another counter would then be required to successively address 384 microwords of a given line.

The manner in which data from the radar transmitter-receiver 10 is first stored in the high-speed buffer memory 12 and then transferred to the bulk storage memory 13 will now be described with reference to FIG. 6 in an illustrative embodiment employing a magnetic drum memory 40 for bulk storage and a random access core memory 41 as a high-speed buffer, although it should be understood that other forms of high-speed random access memories may be employed for the buffer memory.

The buffer memory 41 is required to store data until all video returns (VR signals) have been received from the radar transmitter-receiver 10 for a given azimuth (AZ), and in the case of a system employing a drum memory for bulk storage until the appropriate sector in the drum is available for the entry of data. Although data is being received from the radar 10 at a slower rate than it is being read from the drum memory 40 for display, it is not always possible for the appropriate sector in the drum to be available immediately after one azimuth line of data has been accumulated in the buffer memory 41. Accordingly, the buffer memory is provided with sufficient capacity to store additional lines of data. For example, with data cyclically read from the drum memory 40 for display at a frame rate of 30 frames per second, and a radar pulse repetition frequency (PRF) of 0.25 kHz, a capacity of eight lines of data is sufficient for the buffer memory 41 to avoid loss of data due to overflow.

The radar transmitter-receiver 10 generates a range pulse R for each VR signal. In that regard, it should be noted that the radar transmitter-receiver 10 generates range pulses at a rate sufficient to provide two samples per 3db resolution element in accordance with standard radar techniques.

The analog-to-digital converter 11 provides 16 levels of quantization and is snychronized by range signals from the radar 10. Since the quantized video return data of a given line (azimuth is to be stored in the drum memory 40 in accordance with the format illustrated in FIGS. 4 and 5, each quantized video return comprising four parallel binary digits is temporarily stored in four bit shift registers 43 to 46. When four quantized video returns have been shifted into the shift registers, a signal is generated to initiate a write cycle in the buffer memory 41 by a two-bit counter 47 which divides the range pulses by four. The 16-bit word formatted in accordance with FIG. 5a is then stored in the buffer memory 41 at an address specified by a three-bit encoder 48 which defines one of eight lines (block) of memory and a range counter 49 which defines one of 96 word locations in the lines specified. The next range pulse recycles the divide-by-four counter 47 from a count of three (binary 11) to a count of zero (binary 00) and in response thereto increments the range counter 49 in order that the next 16-bit word accumulated in the shift registers may be stored in the next successive word location of the same line in the buffer memory 41.

Once video returns from 384 range elements have been quantized and stored in 96 word locations of the buffer memory 41 in a given line (block), the radar transmitter-receiver 10 transmits another pulse of electromagnetic energy into space at a new azimuth position of its directional antenna (not shown). At the same time, the radar transmitter-receiver 10 transmits a pulse over a line 50 to reset the range counter 49 and advance a sequencer illustrated as a solenoid actuated stepping switch 51 from one contact to the next. The wiper arm of the sequencer is connected to a source of power (B+) to cyclically energize its eight contacts which are connected to the three-bit encoder 48. The contacts are numbered 1 to 8 and the three-bit encoder 48 translates each of the decimal numbers 1 to 8 into a corresponding three-bit binary number for addressing the buffer memory 41 as noted hereinbefore.

The eight contacts of the sequencing stepping switch 51 are connected to a block 52 of eight line address registers such that they are successively enabled to receive 9-bit line address codes from an analog-to-digital converter 53. However, a 9-bit azimuth code is not entered into an enabled line address register until the pulse which advances the sequencing stepping switch 51, and which also synchronizes the converter 53, is transmitted through a suitable delay element 54, such as a multivibrator, to assure that the sequencing stepping switch 51 has advanced to its new position before the new azimuth code is entered in parallel. That may be accomplished by implementing each line address register with a bank of D-type flip-flops, each connected to receive a clock pulse from the trailing edge of the delay multivibrator 54 through an AND gate (contained within the block 52) enabled by the contact of the stepping switch 51 assocated with the register. In that manner, the line (azimuth) address to be stored in the buffer memory 41 until the next pulse is transmitted over the line 50 is stored in one of eight line address registers associated with one of eight blocks of buffer memory in order that the appropriate line (block) of the buffer memory may be addressed for transfer of data into the drum memory 40.

It should be noted that in some applications of the present invention, the radar transmitter-receiver 10 will include a computer for initiating pulses over the line 50, one pulse for each of 360 lines of data to be stored and displayed, and to initiate range pulses, one range pulse for each of 384 range elements per line (azimuth). It should also be noted that the function of the sequencer (illustrated as a stepping switch 51 for simplicity) may be implemented by the digital computer. Alternatively, the function may be implemented by an electronic sequencer equivalent to the electromechanical stepping switch 51 shown.

As noted hereinbefore, the data read into the eight line blocks of the buffer memory 41 in the manner just described is stored until the appropriate line blocks in the drum memory 40 are available for transfer thereto. The cyclic operation of the drum memory 40 is at a sufficiently fast rate to assure that appropriate line blocks become available at a sufficiently high rate to assure that a given line block in the buffer memory 41 is transferred to the drum memory 40 before that line block is again addressed by operation of the stepping switch 51. That is easily accomplished, even though the range pulses transmitted by the radar transmitter-receiver 10 for 384 range elements of a given line (azimuth) are at the rate of 1 MHz or at a rate substantially equal to the drum memory 40, because of substantial time lapse between azimuth triggers of the radar 10. In other words, the sweep of the radar in azimuth is typically at a PRF of 0.25 kHz, thereby allowing substantial time between the accumulation of data from one line to the initiation of a data accumulation cycle for the next line.

Once the radar 10 starts to receive VR data at a new azimuth, the high-speed buffer memory stores data until 384 range samples have been quantized and stored. Assuming a range rate of 1 MHz, the shift registers can store quantized target data from the first four range elements during the first four range pulses (i.e., during the first four microseconds). Thereafter, the buffer memory 41 must start storing data during the remaining 384 range pulses (i.e., during the remaining 384 microseconds). After the first four range pulses, the divide-by-four counter 47 initiates the first of 96 write cycles.

A block 56 of eight line address comparators is used to address the buffer memory 41 in order to transfer data to the drum memory 40. Each block transfer operation has preference over the storing of incoming data in the buffer memory 41. Accordingly, once a comparator in the block 56 transmits a signal signifying that one of the line addresses stored in the block 52 of line address registers has been found in the drum memory 40, a flip-flop 57 is set through an OR gate 58. The true output terminal of the flip-flop 57 controls the read operation of the buffer memory for a block transfer cycle, thereby shutting out the entry of new data from the shift registers 43 to 46. The loss of any new data is not critical since the data in the drum memory is up-dated once during each scanning cycle of the radar 10. Moreover, with a limited scanning angle of typically 100° and a beam width of typically 2°, the display of 360 lines provides considerable overlapping or redundancy between adjacent lines so that loss of data in one line during one scanning cycle will not be noticeable in the display.

It should be noted that every line block of data in the drum memory 40 is addressed once per drum revolution or per frame cycle, which is typically every 33.3 milliseconds or less. When the line (azimuth) address reaches 360 and starts back through 359, the blocks of data stored in the buffer memory 41 for those addresses will assuredly be stored before the return sweep is started because the turn-around time for the radar antenna is typically 100 milliseconds. For radar systems employing electronic beam scanning where the turn-around time could be less than a drum revolution period, the electronic scan control system may be programmed to provide sufficient delay before starting the return sweep. All this also applies to the turn-around at line 1 since the problem is the same at both ends of the scanned sector.

The manner in which the line blocks of data in the drum memory 40 are addressed will now be described. As noted hereinbefore, the drum memory 40 carries the address of each line block of data on a separate track which is continually being read through a line address register 60 and compared in parallel with all line addresses stored in the eight registers represented by the block 52. That is accomplished by the eight separate comparators represented by the block 56.

When a given address in the register 60 compares with an address in one of the eight registers in the block 52, a corresponding comparator in the block 56 produces a coincidence signal over a discrete line connected to the OR gate 58, the 3-bit encoder 48, and the associated one of the address registers in the block 52. That register is immediately reset to clear it for the next azimuth coding of the line of incoming data to be stored in the buffer memory. At the same time, the OR gate 58 sets the flip-flop 57 which causes the 3-bit encoder 48 to store in one of eight flip-flops contained therein the identity of the discrete line energized by a coincidence signal and switches the 3-bit encoder from the contacts of the stepping switch 51 to the flip-flops in the encoder 48 associated with the discrete lines from the comparators in the block 56. In that manner, the energized line from the block of comparators 56 is effectively substituted for an energized line from the stepping switch 51 in order that a separate block of data in the buffer memory 41 may be addressed. The flip-flop 57 also switches addressing logic in the buffer memory 41 from the 7-bit output of the range counter 49 to the 7-bit output from a word counter 61. That counter is connected to the output of the OR gate 58 in order that it be reset to address the first of 96 words in the line block of data now being addressed for transfer to the drum memory.

At the same time that the word counter 61 is reset, a write delay enable (WDE) generator 62 is triggered by the output of the OR gate 58. Thereafter, clock pulses from the drum memory 40 will initiate read cycles in the buffer memory 41 directly, and upon each word being read out, the clock pulses increment the word counter 61 until a count of 96 is reached, at which time the flip-flop 57 is reset to disable read operations and restore the 3-bit encoder 48 and word addressing logic in the buffer memory 41 to the contacts of the stepping switch and the outputs of the counter 49. In the meantime, each clock pulse which initiates a read cycle in the buffer memory 41 triggers the WDE generator 62 to cause each word of data being read from the buffer memory 41 into a bank of flip-flops and associated drive amplifiers represented by a block 63 to write the word into the appropriate word location in the data band of the drum memory 40.

It should be noted that the delay in writing the word in the drum memory after the clock pulse has been read will not affect the process of reading stored data from the drum memory for display since clock pulses used to strobe read amplifiers connected to the same read-write heads are similarly delayed in a manner well known to those skilled in the art of writing into and reading from a drum memory through read-write heads. Alternatively, separate read heads may be displaced an appropriate amount to compensate for the delay introduced in storing data through operation of the WDE generator 62, but read-write heads are preferred since maintaining precise spacing between separate read and write heads is difficult, particularly with high density storage of data on the data band.

The operation of the buffer memory 41 and drum memory 40 thus far described is common to only the scanning modes illustrated in FIGS. 2b and 2c, which are the B-scan and PPI modes. For the "passing scene" mode illustrated in FIG. 2a, the operation is the same except that for the analog-to-digital converter 53, a counter 65 is substituted to provide line addresses for the eight line address registers represented by the block 52. That is accomplished by energizing a solenoid K1 in response to mode control signal $MC_1$ which closes a contact K1a and opens a contact K1b. The counter 65 is driven by a voltage controlled oscillator 66 which receives at an input terminal 67 a signal having a voltage amplitude proportional to velocity. That signal may be a manually controlled input such as through a potentiometer when the aircraft carrying the side-looking radar is flying at a known ground speed, but it is preferably provided by a digital computer programmed to calculate ground speed from other aircraft instrumentation.

The oscillator 66 operates at a very low frequency as compared to the PRF of 0.25 kHz. For example, at a relatively low velocity of the aircraft, the oscillator frequency may be about 10 Hz. Accordingly, the sequencing stepping switch 51 must be operated at the lower frequency of 10 Hz, but in synchronism with the PRF signal. Accordingly, a third contact K1c of the mode control relay K1 is provided to connect the PRF signal to the sequencer through a PRF meter 68 which gates one PRF pulse during each cycle of the oscillator 66. That can be accomplished by setting a flip-flop in the PRF meter 68 with the leading edge of the signal from the oscillator 66 and allowing the set flip-flop to gate a PRF pulse to the sequencer. The gated PRF is then employed to reset the flip-flop, thus assuming that another PRF pulse is not metered until the next cycle of the oscillator 66 advances the counter which is a counter adapted to automatically recycle when the next cycle occurs after reaching a count of 360.

Between metered PRF pulses, successive lines of video data are stored in the same block of the buffer memory. When the next PRF pulse is metered, to advance the stepping switch 51 to the next position, the last line of video data stored is left in the buffer memory. Consequently, for every line of video data stored, there will be 249 lines of video data discarded (assuming an oscillator frequency of 10Hz for very slow aircraft velocity). For some applications it may be desirable to average the 250 lines of video data received between metered PRF pulses. That may be done at the input of the buffer memory by adding the corresponding range element data to data previously stored and each time storing the sum divided by 2. To accomplish that, the buffer memory may be modified to read out through an adder each time it is addressed for storage. The other input to the adder is, of course, the new data to be stored. The binary sum shifted one bit position is then stored as the average.

Data stored in the drum memory 40 is automatically and cyclically read out, as noted hereinbefore, for display according to any of the formats illustrated in FIGS. 2a, 2b and 2c, except while a line block of data is being stored due to the use of common heads for both reading and writing, as long as a control signal $MC_2$ is true so that a relay K2 in FIG. 7 is de-energized to connect a digital-to-analog converter 70 to a video amplifier 71. Data automatically read from the drum memory according to the formats illustrated in FIGS. 3, 4 and 5a is transferred into shift registers 72, 73, 74 and 75 in parallel, one 16-bit word at a time, with the most significant bit of each microword (range element data) in the shift register 75 and the least significant bit of each microword in the shift register 72.

The drum clock is increased in frequency by a factor of four by a multiplier 76 in order to shift the contents in the shift registers into the digital-to-analog converter 70 four bits at a time, each four bits representing the video return data for a given range element of a line being displayed in a cathode ray tube 78. In that manner, target data pertaining to a given line or azimuth is reconverted into an analog form for control of the intensity of the electron beam in the cathode ray tube 78.

The position of the electron beam is controlled in the horizontal (X) axis by a ramp (slow sweep) signal transmitted to the X input terminal of the beam deflection system for the cathode ray tube 78 by a digital-to-analog converter 79 which converts a binary number representing the number of a line block of data being displayed on a vertical raster into an analog signal proportional thereto. That binary number is generated by a display line counter 80 which counts line sector mark pulse from one to 180 for one field of line data. A field mark pulse then resets the counter 80 to return the slow sweep signal to zero for the next field of a frame. A one bit binary counter $B_1$ counts the field mark pulses in order to distinguish between odd and even fields of a frame being displayed. The output of the binary counter $B_1$ is connected to the digital-to-analog converter 79 as the least significant binary digit of a binary number to be converted to an analog signal so that for an odd field, when the output of the binary counter $B_1$ is zero, the 180 line rasters will be initiated at given positions along the X axis of the cathode ray tube 78, and for an even field, when the output of the binary counter $B_1$ is equal to 1, the 180 line rasters will be initiated from positions just to the right of the odd field, assuming a left to right slow sweep. In other words the binary counter $B_1$ responds to the field marker pulses to offset the even field rasters from the odd field rasters for an interlaced display of 360 lines of data.

The fast sweep signal applied to the Y terminal of the field deflection system for the cathode ray tube 78 is generated by a gated integrator 81 which is reset to zero during each line retrace period in response to a signal applied to the gate of a field effect transistor connected across the integrating capacitor. At the end of the line retrace period, the field effect transistor is turned off and a ramp signal which increases at an appropriate rate is applied to the Y terminal of the beam deflection system of the cathode ray tube 78.

The line retrace signal applied to the field effect transistor of the fast sweep generator 81 is generated by a flip-flop 82 which is set to turn off the field effect transistor of the fast sweep generator 81 in response to a line sector mark pulse at the same time that a range element counter 83 is reset to initiate counting range elements shifted through the register 72 to 75 into the digital-to-analog converter 70. The range elements are then counted by counting clock pulses applied to the shift registers from the multiplier 76. When 96 range elements have been counted, a decoder 84 responds to that count in the range element counter 83 and resets the flip-flop 82, thereby turning on the field effect transistor of the fast sweep generator 81 to initiate a line retrace.

The line retrace signal is transmitted through an OR gate 85 to a control terminal of the video amplifier 71 as a blanking signal which immediately drives the video signal applied to the cathode ray tube 78 to zero. A field retrace signal is similarly transmitted through the OR gate 85 when the display line counter 80 is reset by a field mark pulse. The duration of the field retrace signal is controlled by a counter 86 through a flip-flop 87. The counter 86 is reset by the field-marker pulse which sets the flip-flop 87. Thereafter, the counter 86 counts 12 clocks pulses from the drum memory 40 and a decoder 88 detects that count to reset the flip-flop 87. In that manner, a field retrace signal from the flip-flop 87 is initiated in response to a field marker pulse and is terminated after 12 clock periods since, as noted hereinbefore with reference to FIG. 3, 12 clock periods of the drum memory 40 are allowed for line and field retrace.

For the "passing scene" display format illustrated in FIG. 2a, the slow sweep signal must be applied to the vertical (Y) axis and the fast sweep to the horizontal (X) axis. Thus, to convert the display mode from a B-scan as illustrated in FIG. 2b to a "passing scene" mode as illustrated in FIG. 2a, the fast and slow sweep signals applied to the cathode ray tube 78 must be interchanged. That is accomplished by energizing a relay K3 in response to a mode control signal $MC_3$.

A relay contact K3c is also actuated when the relay K3 is energized to substitute for the normal field mark pulse read from a track on the drum memory 40 a field sync pulse generated by a monostable multivibrator 69 and a "modulo 180" counter 77 via an OR gate 89. The monostable multivibrator 69 is triggered by a pulse from the comparator 56 via the OR gate 58 (FIG. 6) when the data stored on the drum 40 is updated. Since the cycle of the drum memory is much shorter than the cycle of the oscillator 66, that will occur only once for every $n$ frames, where $n$ is the ratio of the drum cycles per second to oscillator cycles per second. Thus, the monostable multivibrator is periodically triggered at a rate which is a function of aircraft velocity to initiate a new field display on a different line, thereby effectively processing the data to present a passing scene with the most recently updated line displayed as the first line of the next field. That resets the display line counter 80 and the field retrace counter 86, but leaves the operation of the binary counter $B_1$ unaltered so that the display of lines of data read from even numbered addresses is displaced on the cathode ray tube from the display of lines of data read from odd numbered addresses. To assure that the operation of the binary counter $B_1$ remains synchronized with the drum memory, the binary counter may be reset by an index pulse read from a separate track each drum cycle just before line 1 is read, but for purposes of this invention, it is assumed that the binary counter $B_1$ is initially synchronized (by means not shown); it will thereafter remain synchronized. However, still other techniques may be employed such as substituting a type-D flip-flop for the binary counter $B_1$ and driving it with the least significant bit of the address of the line to be read out next.

The "modulo 180" counter 77 is also reset by the output of the monostable multivibrator 69. Line sector mark pulses are then counted so that after every 180 lines are displayed, a field sync pulse is transmitted through the OR gate 89. In that manner the display remains constant until the comparator 56 indicates a line of data is to be updated, at which time the "modulo 180" counter 77 is reset.

For a PPI display as illustrated in FIG. 2c, the fast and slow sweeps are disconnected from the X and Y input terminals of the cathode ray tube 78 by a relay K4 in response to a mode control signal $MC_4$. In the energized position, the relay K4 connects the X and Y control terminals of the cathode ray tube 78 to input terminals 90 and 91. Those input terminals receive fast sweep signals generated by gated integrators 92 and 93, respectively, shown in FIG. 8. While the normal fast sweep generator 81 in FIG. 7 is connected to a source of regulated voltage B+, the fast sweep integrators 92 and 93 are connected to function generators 94 and 95, respectively. The function generator 94 receives the slow sweep voltage signal from the digital-to-analog converter 79 (FIG. 7) and transmits to the input of the integrator 92 a signal which is the sine function of the slow sweep signal. The function generator 95 similarly receives the slow sweep signal to deliver to the integrator 93 a signal which is the cosine function of the slow sweep signal. The combined effect of the output signals 92 and 93 transmitted to the X and Y control terminals of the cathode ray tube 78 is a PPI display as shown in FIG. 2c.

If it is desired to display PPI scan data in parallel lines according to the B scan format illustrated in FIG. 2b, the mode control signal $MC_4$ is set false to place contacts of the relay K4 in the deenergized positions shown. Each line of PPI data will then be displayed as a line of B-scan data.

Figure 9:
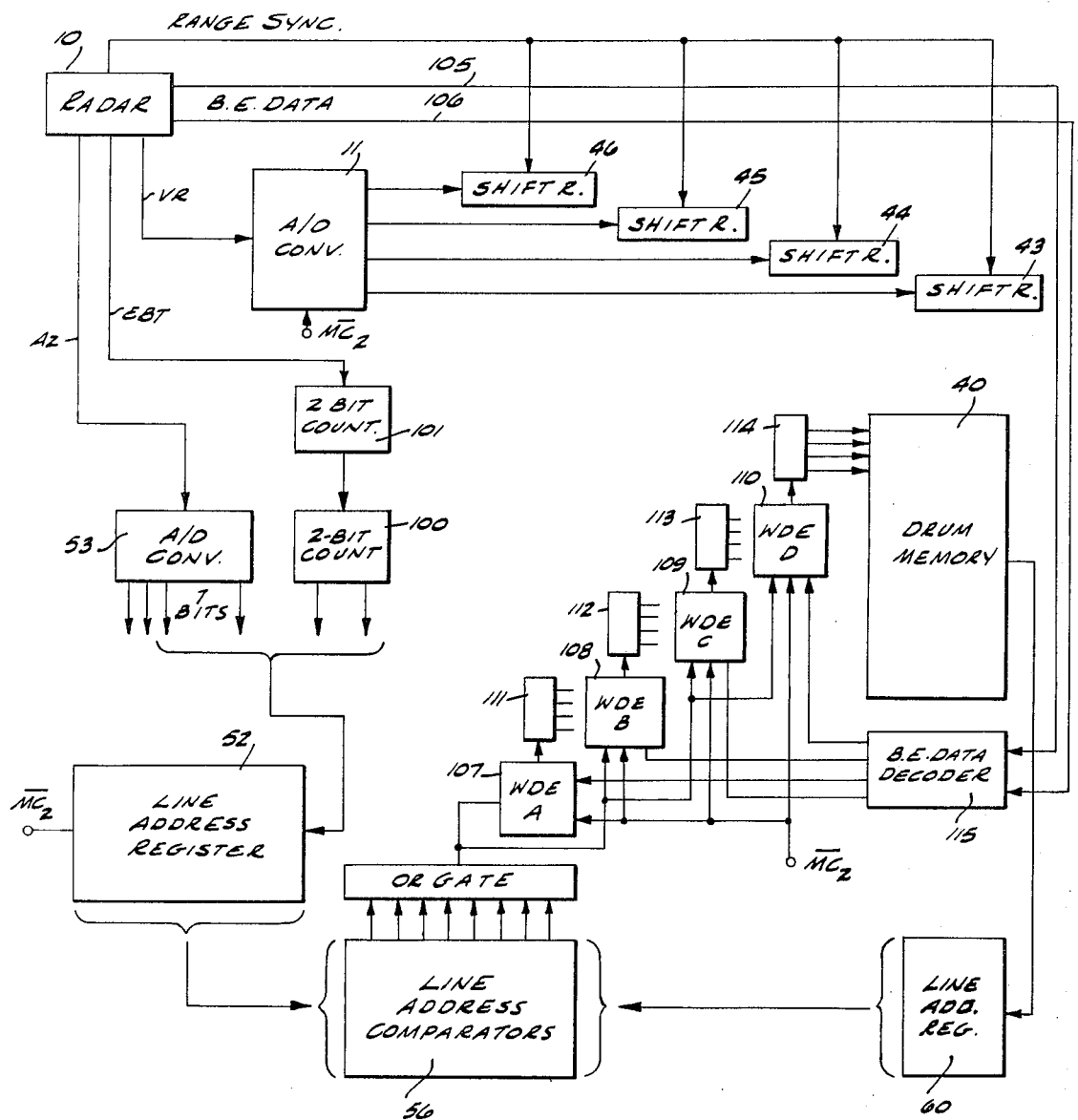
FIG. 9 is a block diagram of an illustrative embodiment of the present invention for storing quantized video return data from successive bar-elevation scanning planes in the system of FIG. 1 operating in the bar-elevation scan converting mode.

The manner in which bar-elevation data is stored and displayed will now be described with reference to FIGS. 7 and 9. It should first be noted that the bar-elevation display format illustrated in FIG. 2d is similar to the B-scan display format illustrated in FIG. 2b in that the slow sweep is along the X axis and the fast sweep along the Y axis of the cathode ray tube 78. However, B-scan video return data is quantized to 16 levels while bar-elevation data is quantized to only two levels, a first level represented by a binary zero when the video return signal fails to exceed a predetermined threshold level, and a second level represented by a binary one when the video return signal exceeds the predetermined threshold level indicating the presence of a target. Accordingly, a four-bit microword may store video return data from corresponding range elements of the four scanning planes as illustrated in FIG. 5b. The remaining 12 of the 16 bit positions in a word stored in the drum memory 40 via shift registers 43 through 46 and the buffer memory 41 may then be employed for data of three other range elements in a four bar-elevation scan. Thus, although the display of bar-elevation data is similar to B-scan data, it is necessary to select four of the sixteen bits of each sixteen bit word read from the memory 40 which pertain to the bar-elevation plane to by viewed on the face of the cathode ray tube 78.

Selection of a given bar-elevation plane for diplay is accomplished by a 5-position switch 96 which, through a bank of OR gates 97, selectively energizes one of four AND gates 98, connected to the appropriate one of the shift registers 72 to 75 receiving data from the drum memory 40 of the bar-elevation plane to be displayed. For example, to display the bar-elevation plane A, the switch 96 is placed in the position shown to enable one of the AND gates 98 coupling the output of the shift register 75 to an input terminal of an OR gate 99. In that manner, the four bits of a given word N pertaining to the A plane in the microwords $MW_m$ to $MW_{m+3}$ shown in FIG. 5b as $A_1$ through $A_4$ are read from the drum memory 40 in parallel into the shift register 75, while the other binary digits of the microwords are read in parallel into shift registers 72 to 74, and in response to clock pulses from the multiplier 76, are shifted in series to the enabled one of the AND gates 98 to the OR gate 99. The output of the OR gate 99 is substituted for the output of the digital-to-analog converter 70 by energizing the relay K2 in response to setting the mode control signal $MC_2$ true. The fast and slow sweep signals are generated in the same manner as for the B-scan mode.

As noted hereinbefore with reference to FIG. 2d, some resolution of target data is sacrificed by storing only 90 lines for a given plane instead of 360 as for the B-scan. The reason for that is to store in the space for the remaining 270 lines past frame histories. The lines of the past frames are interlaced with the current frame for display side by side to allow the observer to distinguish a target from noise since a target will produce a cluster of four target returns whereas noise will be randomly displayed. That is accomplished by having a given line of the most recent frame displayed with corresponding lines of the last three past frames on four adjacent vertical raster lines such that a target will produce a cluster of four target returns with 2, 3 or 4 in a line. The spacing between target positions thus displayed will be proportional to the rate at which the target is closing. The direction of the target motion relative to the radar 10 is indicated by the position of the most recently updated target relative to the other target positions. In that manner, such a display augments the digital target display and detection system. It enables the observer to not only quickly distinguish targets from noise, but also to determine whether the range is opening or closing and at what rate and in which direction.

The switch 96 has in addition to four positions labeled A, B, C and D for selecting one of the four bar-elevation planes for display, a fifth position labeled ABCD for display of all planes simultaneously. That is accomplished by enabling all of the AND gates 98 through all of the OR gates 97 when the switch 96 is in the fifth position. The result is that data from corresponding range elements of a given line (azimuth) of all four bar-elevation planes will be combined by the OR gate 99 for display. Such simultaneous display of all four bar-elevation planes is useful for general surveillance until a cluster of four target returns appears. The observer can then quickly determine the elevation plane of the target by operating the switch 96 through the positions A,B,C and D until the same cluster of target returns reappears on the face of the cathode ray tube 78.

In some applications it may be desirable to display only the plane being scanned until a target is noted in a given plane, at which time the operator may select only that plane for display. That may be readily accomplished with an electronic plane selecting switch which, in the automatic sequential mode, will receive bar-elevation data from the radar 10 and in response thereto select the bar-elevation plane being scanned. To manually select a given plane, pushbutton control switches may be actuated to substitute for the bar-elevation data a code for the plane to be displayed.

To store the bar-elevation data for the planes A, B, C and D, the system of FIG. 6 is modified by setting the mode control signal $\overline{MC_2}$ true, thereby modifying the analog-to-digital converter 11, such that for a video return below a given threshold, a binary zero is produced on each output terminal, and for a video return above that threshold, a binary one is produced on each output terminal. Thus, for a valid target return, the output is a binary number 1111; otherwise it is a binary number 0000. That may be readily accomplished by modifying the bias and gain of an input amplifier of the analog-to-digital converter 11 in response to the mode control signal $\overline{MC_2}$. Alternatively, the mode control signal may be employed to simply substitute an appropriate two-level analog-to-digital converter. The mode control signal $\overline{MC_2}$ also disables the WDE generator 62 and modifies the 9-bit input to the block 52 of eight line address registers from the analog-to-digital converter 53 to include only the least significant seven binary digits as the most significant seven bits and substitutes in the two least significant bit positions the output of a 2-bit counter 100 as shown in FIG. 9 The 2-bit counter 100 is cascaded with a two bit counter 101 which counts elevation bar trigger pulses (EBT) each of which occurs at the beginning of a four bar-elevation scanning pattern. In that manner, the 90 lines of each plane for a given frame are interlaced with the 90 lines of three past frames. For example, for a given scan pattern the output of the 2-bit counter 100 may be 00 so that 90 lines are stored in every fourth line block or sector having as its address a binary number ending in 00 in the least significant bit positions. During the next scanning cycle the two bit counter 100 is incremented to the binary count of 01 so that 90 lines are stored in lines adjacent to the lines of the preceding scanning cycle. After the two bit counter 100 has cycled from a count of binary 00 to a count of binary 11, four past frame histories will have been stored and thereafter the current frame of data will replace the oldest frame of data in the drum memory 40 as counter 100 recycles to the count of 00.

From the foregoing it may be appreciated that all four shift registers 43 to 46 are loaded with the same data, which is with four binary digits, each digit representing a video return for a given range element of the plane being scanned. However, as will be appreciated more fully from the following description, only one group of four binary digits is stored in the drum memory 40 while all four groups are actually stored in the buffer memory in the manner described with reference to FIG. 6. In other words, while the contents of the shift registers 43 to 46 will be stored in the buffer memory 41 as for other modes of operation, only four bits will be transferred to the drum memory 40. If the drum memory 40 is provided with sufficient memory capacity, each bit 1 of a group of four bits may be intensity coded as the group is transferred to the drum memory. For example, while scanning plane A, the data may be stored with a maximum intensity code 11 for each binary 1 while data for the three past histories is modified by subtracting a binary 1 from each intensity code. In that manner, three successive histories are stored with three levels of intensity for a target, the levels being represented by binary numbers 11, 10 and 01 with the largest number for the most recent history. A somewhat similar technique for modifying the stored intensity codes will be described with reference to FIG. 11 for an eight bar-elevation scan pattern where only intensity coding is used, i.e., where past history is not separately stored but indicated by intensity coding.

To transfer bar-elevation data from the buffer memory 41 into the drum memory 40, the block 56 of line address comparators compares each line address (which corresponds to an antenna azimuth) as it is read from the drum memory 40 into the line address register 60 with all of the line addresses stored in the block 52 of address registers as described with reference to FIG. 6. When one of the comparators 56 produces an output signal, a transfer operation is initiated as described hereinbefore except that in place of the single WDE generator 62 for the block 63 of 16 flip-flops and driver amplifiers in FIG. 6, the mode control signal $\overline{MC_2}$ conditionally enables four separate WDE generators 107, 108, 109 and 110 associated with the respective groups of four flip-flops and driver amplifiers 111 to 114 associated with the respective planes A, B, C and D of the bar-elevation data in a given word being transferred from the buffer memory 41 to the drum memory 40. The bar-elevation data transmitted over lines 105 and 106 selects the appropriate one of the WDE generators for the plane currently being scanned through a decoder 115. In that manner, only one group of four digits of a given word read from the buffer memory 41 is transferred into the drum memory. The remaining three groups of binary digits of the word memory location into which the one group is transferred will remain on the drum unaltered until the radar 10 scans through the other planes such that after scanning through all four planes A, B, C and D, all of the data in a given line block will be up-dated.

Figure 10:
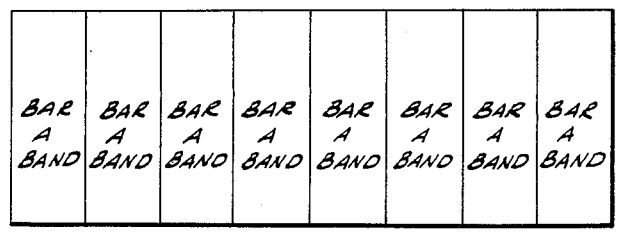
FIG. 10 illustrates the organization of bar-elevation data in a recirculating memory for an 8-bar-elevation scanning mode with intensity coding of display element data for a digitally augmented detection system.
Figure 11:
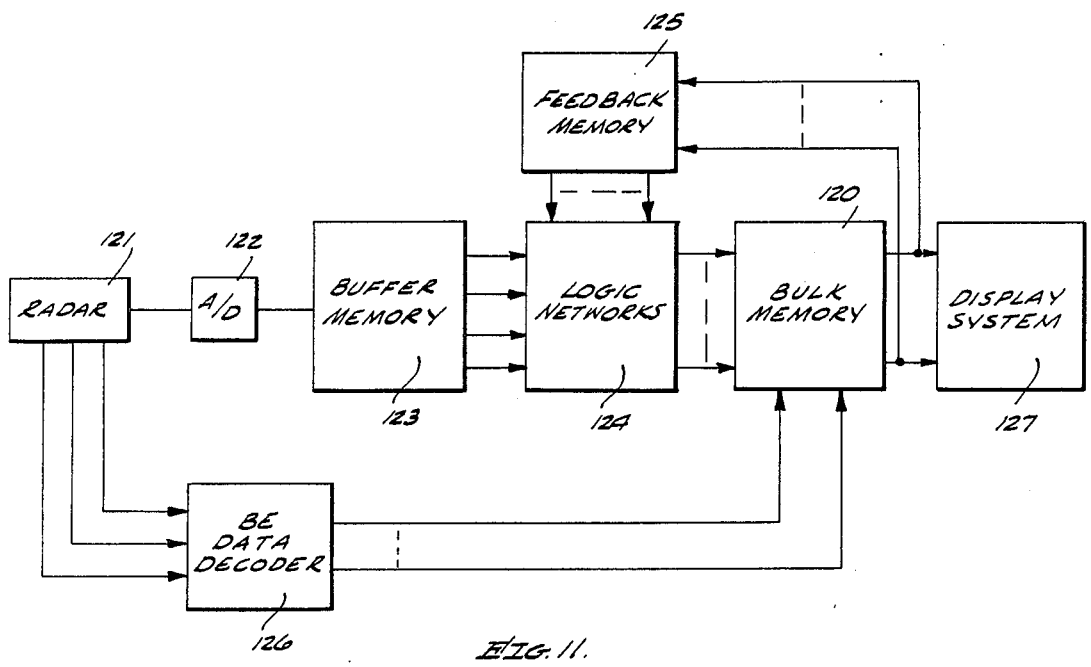
FIG. 11 is a general block diagram of a system for implementing an elevation bar scan converting system with the two-bit code store of FIG. 10 to digitally augment target detection.

FIG. 10 illustrates the general organization of data on a drum or other type of bulk memory for a second embodiment of a bar-elevation scan converter illustrated in FIG. 11 having provision for eight bar or planes A to H instead of four. The data from each plane is stored in a separate band of bulk memory 120 with two bits for each range element.

Two bits of data are stored for each range element in order to provide significantly greater enhancement of target detection. If in a given range element there is a target return during a current scan, a binary number 11 is stored. Thereafter, if a target return is received for the same range element during any subsequent scan cycle, the same binary number is stored again. However, if a target return is not received from the same range element during a following scan cycle, a binary number 10 is stored. If during the next succeeding scan cycle a target return is again not received from the same range element, a binary number 01 is stored, and if that is immediately followed by another scan cycle that does not produce a target return from the same range element, the binary number stored is 00. A truth table for this technique is as follows:

| Q | $M_2M_1$ | $N_2N_1$ |
|---|---|---|
| 1 | X X | 1 1 |
| 0 | 1 1 | 1 0 |
| 0 | 1 0 | 0 1 |
| 0 | 0 X | 0 0 |

In that table, Q is the incoming binary digit for a given range element, $M_2M_1$ is the binary number stored during the previous scan cycle and $N_2N_1$ is the binary number to be stored in place of the number $M_2M_1$. An X indicates that the table is true for either a binary 1 or 0 in its place. Logic equations to implement the foregoing table may take the following form.

$N_1 = Q + \overline{Q} \, M_2\overline{M_1}$
$\overline{N_1} = \overline{Q} \, M_2M_1 + \overline{Q} \, \overline{M_2}$
$N_2 = Q + \overline{Q} \, M_2M_1$
$\overline{N_2} = \overline{Q} \, M_2\overline{M_1} + \overline{Q} \, \overline{M_2}$ when the data stored according to the foregoing scheme is read out of the bulk memory 120 for display, the binary digits are processed two at a time to produce a four-level video display for each target element. In that manner the presence of a target is indicated by a spot of maximum intensity trailed by two dots of minimum and intermediate intensity unless, as is very unlikely in air-to-air radar applications, there is not any relative motion between the target and the radar. Accordingly, a spot of maximum intensity can be disregarded as noise unless trailed by two dimmer spots. That significantly increases the overall signal-to-noise ratio of the system, and the direction of the trail will indicate not only whether the target is opening or closing in range, and the rate at which range is changing, but also the direction of relative motion between the radar and the target.

If a VR signal for a given range element from a radar 121 exceeds a predetermined threshold level, a binary 1 is transmitted by a two-level analog-to-digital converter 122 as in the first embodiment, and stored in a buffer memory 123 as the incoming data Q in groups of binary digits, such as four binary digits from four successive range elements in a manner similar to the first embodiment. The technique described with reference to the foregoing table is implemented in the transfer of data from the buffer memory to the bulk memory 120 which, for the purpose of describing a specific embodiment, is assumed to be a drum memory in order that the transfer and read out techniques, described hereinbefore, may apply with only those modifications indicated by this second technique for augmented digital target detection.

The transfer of data from the buffer memory 123 to the bulk memory 120 may be in groups of four binary digits from the buffer memory, each digit representing a video return from a different range element. The transfer is made through a block 124 of four logic networks, each implemented in accordance with the foregoing logic equations where Q is an input from the buffer memory, and the digits $M_1$ and $M_2$ are inputs from a feedback memory 125. The digits $N_1$ and $N_2$ are then the output code stored in the positions from which $M_1$ and $M_2$ were read during a previous bulk memory cycle. A three-bit code from the radar 121 specifies which of eight bar-elevation planes is being scanned. A bar-elevation data decoder 126 then enables read and write heads in the bulk memory for the band of data corresponding to the plane being scanned.

When a particular line address in the bulk memory has been located, as in the previous embodiment, a transfer operation is initiated. However, two memory cycles are required to complete the operation. In the first cycle, a line block of data is read out of the bulk memory and stored in the feedback memory. The data read out is also displayed if a display system 127 is set to display the plane being scanned; if not, display of the line being read out is interrupted. During the next cycle of the bulk memory, when the same line address is again available, the updated data is stored in the bulk memory. That may be accomplished by setting a control flip-flop the first time a comparator indicates the particular line address has been located the first time. The flip-flop then controls the read out operation, i.e., controls the line block transfer from the bulk memory to the feedback memory. When the comparator again indicates the particular line address has been located the second time, the control flip-flop is reset to initiate the transfer operation from the buffer memory to the bulk memory through the logic networks. The feedback memory may be a core memory, or any other type of memory capable of being addressed by a word counter in synchronism with the buffer memory. Thus, data read from the bulk memory during one memory cycle is restored in updated form during the next memory cycle.

The feedback loop comprises two channels for each range element, one channel for each binary digit. Accordingly, to transfer data from four range elements, eight channels are required for the feedback loop while only four channels are required for the transfer from the buffer memory 123 into the logic network 124. Otherwise, the transfer techniques to be employed are similar to the techniques described with reference to the four-bar-elevation scan system. The display techniques are also similar except that two output channels are employed with a digital-to-analog converter. The output of the converter is then employed to modulate the intensity of the display for each range element.

Figure 12:
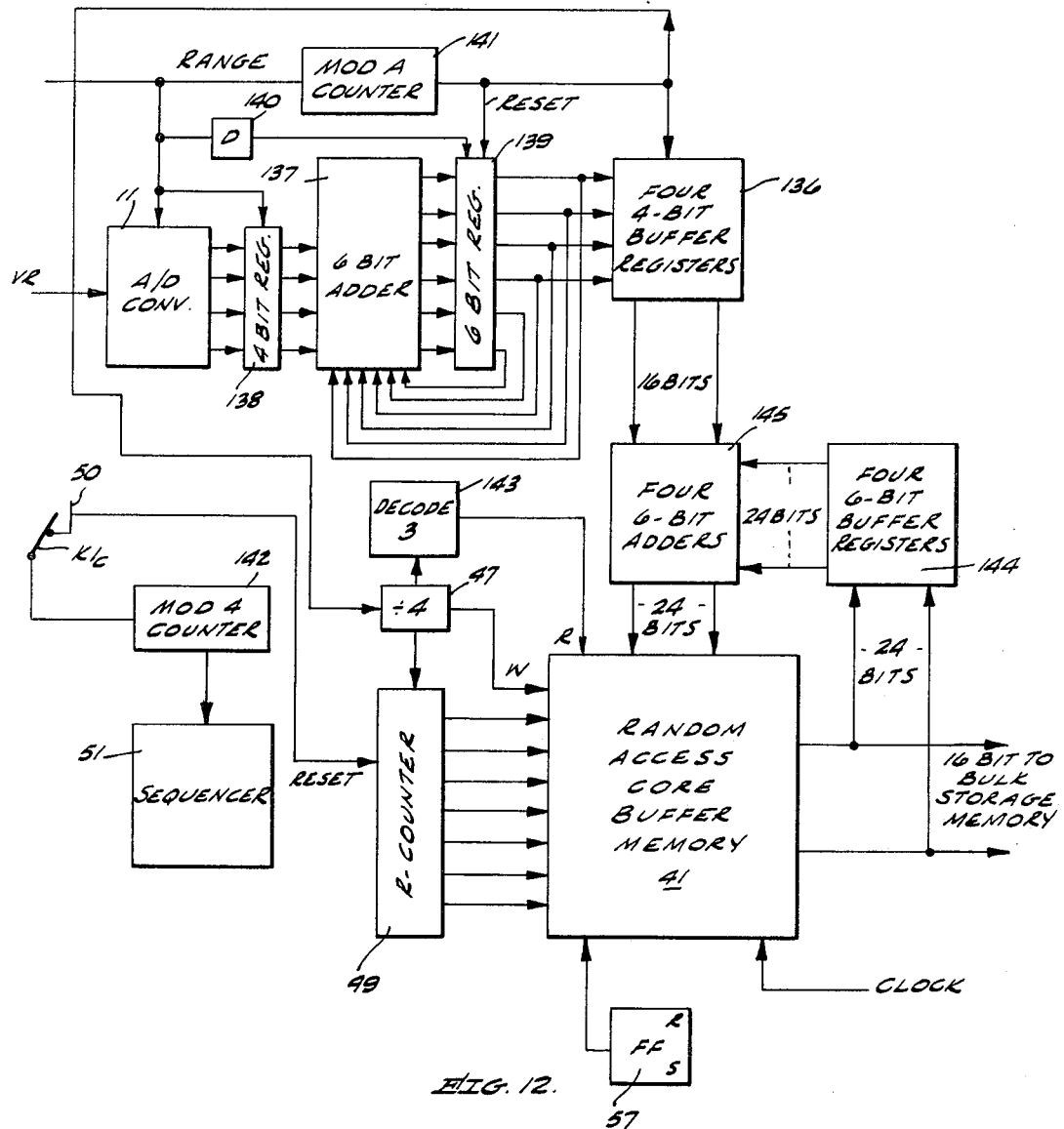
FIG. 12 illustrates a modification of the present invention.

FIG. 12 illustrates modifications useful for all types of scan patterns in systems where more returns are being received from successive range elements along a given line than are to be stored, or where more lines are being scanned than are to be stored. The number of elements to a line is determined by the repetition rate of the RANGE pulse from the radar set and therefore can be controlled, but rather than decrease the RANGE pulse rate to produce just the number n of evenly spaced range elements that can be stored, it is often preferable to keep the RANGE pulse rate high and to average the data of equal numbers of successive range elements for each of the elements stored. For instance, if 1,000 RANGE pulses are generated for each line, and only 250 range elements are to be stored for each line with each range element converted into a four bit code, the present invention contemplates averaging the video returns of every four successive range elements received, and storing the average as a single range element. The result is more complete storage of available information. The same holds true for averaging adjacent lines, element by element, where more lines are being scanned than are to be stored.

To facilitate understanding the manner in which these modifications are to be used, the important parts of the basic system being modified are shown in FIG. 12 and identified by the same reference numerals as in FIG. 6 except that the four shift registers 43 to 46 are shown as a single functional block 136. However, it should be understood that just as the present invention is not limited to the exemplary embodiment of FIG. 6, there modifications are to be described in a specific embodiment only by way of example, and not by way of limitation. For example, an analog averaging technique could be used in place of the digital averaging technique for an arbitrary number of successive range elements, but the digital techniques are preferred, particularly if the number of successive range elements to be averaged is divisible by two.

To average data from four successive range elements, a 6-bit adder 137 is employed with a 4-bit input register 138 and a 6-bit accumulator register 139. During each RANGE pulse, the analog-to-digital converter 11 is cleared by transferring the last 4-bit number into the register 138. After a short delay set by a device 140, the contents of the register 138 are added to the contents of the accumulator 139 through the 6-bit parallel adder 137. The sum is then stored in the accumulator 139. After four such addition cycles, as determined by a modulo 4 counter 141, the accumulator is cleared (reset) while the four most significant digits thereof are transferred into the buffer register 136 as the next 4-bit data element to be stored. Thus by transferring only the four most significant digits, the average of the four video returns summed in the accumulator is taken as the video return element data. The delay of the device 140 is, of course, set sufficiently long to allow the accumulator to be cleared before allowing accumulation of the first one of the next four elements of digital data to be averaged. Once four averages have been transferred into the registers 136, they are transferred into the buffer memory 41 as a microword in the same manner as described with reference to FIG. 6, using the output of the counter 141 as the input for the counter 47, except to the extent that is modified for the purpose of averaging adjacent lines.

A modulo 4 counter 142 is provided for essentially the same function in line averaging as the counter 141 serves in element averaging. It determines the number of incoming lines of data to be averaged by dividing the number of pulses applied to the sequencer 51 by that number. The number is here again four but only for convenience since that number may be any integer, but preferably one divisible by two in order to be able to conveniently divide the sum of corresponding data elements by that number.

As each microword of a given line is ready to be transferred from the registers 136 to the buffer memory 41, the buffer memory is addressed in the same manner as described with reference to FIG. 6, with two differences. Each location addressed for the purpose of storing four 4-bit data elements is actually 24 bits long since the sum of four 4-bit numbers may be 6 bits and accuracy requires that they all be carried until transfer is made to the bulk storage, at which time the most significant four of every group of six is transferred as the average data for a given range element. The other difference is that before the counter reaches the count of four, such as when it reaches the count of three, a decoder 143 detects that count and initiates a read only cycle of the memory 41 in order to place the contents of the memory location being addressed in four 6-bit buffer registers. The four bits of each range element in the buffer registers 136 are added to the least significant four bits of corresponding range element data in the buffer registers 144 via four 6-bit parallel adders 145. All of the sum and carry digits are then stored when the counter 47 reaches the count of four to initiate a write cycle and increment the address counter 49.

When the flip-flop 57 is set to initiate a transfer operation, as described hereinbefore with reference to FIG. 6, a line block of data is transferred to the bulk storage memory, clearing the 24 bit locations of each microword in the process. That is accomplished by having the reading take place for each microword as a read-only operation, using destructive memory techniques which require a core to be reset to binary 0 in order to read out a binary 1. However, the bulk memory accepts only the four most significant bits of each 6-bit data element in groups of four to make up the 16-bit microword referred to in the transfer operation of a line block of data. That is done simply by selectively connecting output terminals of the buffer memory to the data input terminals of the bulk storage system.

It should be appreciated that although these averaging techniques have not been described with reference to any particular scan conversion mode, they are most useful in the PPI and passing scene modes, and may be limited to such modes by removing the averaging circuits through mode control switches for all other modes. In the passing scene mode, the relay contact K1c is in its alternate position as described with reference to FIG. 6.

An alternative arrangement for averaging lines of data without increasing the size of the memory beyond four bits per element requires four 4-bit adders and four 4-bit registers for the blocks 145 and 144. Each adder is then so connected to the buffer memory 41 as to have the sum divided by two. That is readily accomplished by having its carry and three most significant binary digits stored as the "average" which may be better denominated as an estimated running average as distinct from the true average. However, for the purpose of this invention, the term "averaging" is considered to embrace both a technique for computing true averages and any technique for estimating an average. Thus, as each element is added, the sum is divided by two and stored as the "average". If the sum is an add number, this "averaging" technique effectively rounds out the sum to the next lower even number upon dividing by two. This technique introduces a further error by dividing the first line elements of a group of lines to be averaged by two. However, the effect of that error decreases as the number of lines in the group increases. Where greater accuracy is required, provision can be readily made for storing the data of the first line of a group to be averaged in memory without dividing by two under control of the counter 142, such as by changing the connections between the adder 145 and the buffer memory 41. The average will then be in error by only that amount introduced by dividing each intermediate sum by two instead of accumulating the sum of all elements and then dividing by the total number of elements in the group being averaged.

The various display modes described with reference to FIG. 7 employ a cathode ray tube and control circuits for proper beam deflection such that the field of data is always properly oriented when displayed. For example, in the passing scene mode, the beam scans horizontal lines while in the B scan mode the beam scans vertical lines. If B scan data is then displayed on a standard television monitor, the bottom of the scene being displayed will be along the left side of the display tube.

Figure 13:
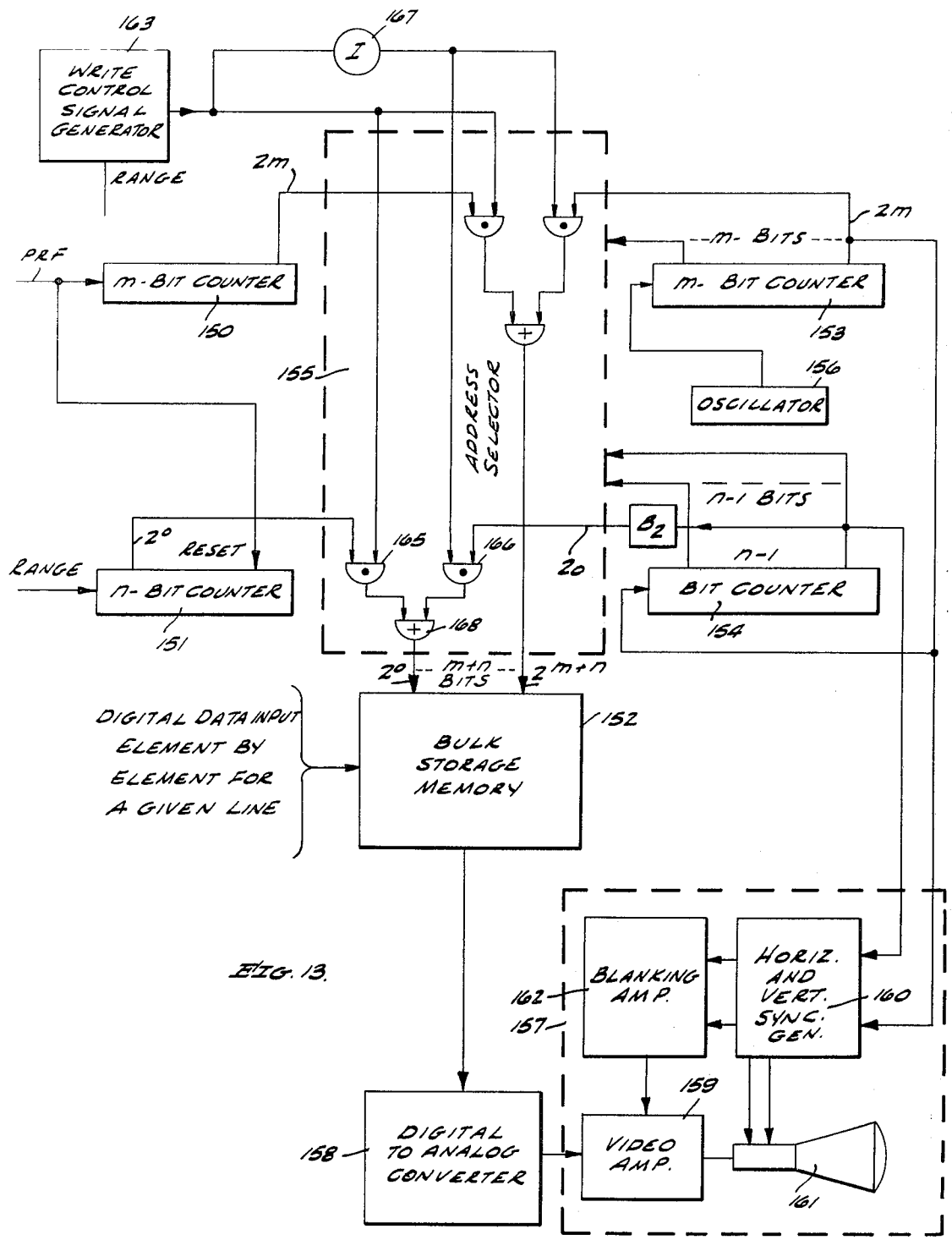
FIG. 13 illustrates application of the present invention to television monitor display.

FIG. 13 illustrates a technique which may be incorporated with the present invention for storing data from vertically scanned lines, i.e. from lines eminating from a base line and orthogonal thereto such as in B scan, and displaying the data with vertical lines on a standard television monitor. The technique is to employ two counters 150 and 151 to address a bulk storage memory 152 such that the first counter 150 is incremented each time a new line is to be scanned until all $2^m$ lines of the field have been scanned. The cycle is then repeated as the data is updated on a line by line basis. This assumes scanning in only one direction (which is rarely, if ever, done) or continuous scanning for a passing scene display using only $m$ lines. For bilateral scanning, the counter 150 is preferably an up-down counter which counts up to $2^m$ and then back down again as lines are scanned in a complete cycle. In that way elements from the same line are directed to the same block of memory as the radar scans back and forth. The counter 150 is thus driven (preferably up and down) by PRF pulses from the radar while the counter 151 is driven by RANGE pulses.

The second counter 151 incremented at a faster rate than the first counter 150 is employed to address successive memory locations of the memory 152 while storing incoming data. A line block of data is assumed to include $2^2$ elements. Accordingly, the second counter includes n stages and will automatically recycle after addressing $2^n$ successive memory locations. However, to assure that the recycling occurs at the start of each new line, the second counter 151 is reset when the first counter is incremented.

For display, the stored data is read out using two additional counters 153 and 154. The counter 153 includes m stages and is substituted for the counter 150 in addressing the memory 152 by an address selector in response a WRITE signal not being true. The counter 154 includes only n−1 stages and is substituted for the counter 151 by the address selector 155, but only for positions other than the least significant bit position of the counter 151. A single stage counter $B_2$ connected in cascade with the counter 154 is substituted for the least significant bit position of the counter 151. The counter 153 is driven by an oscillator 156 at a rate desired for the display of a given line. As the last element of a given line is read for display, the output from the most significant bit position thereof increments the counter 154. If the single stage $B_2$ is assumed to be set, only the odd numbered lines of stored data will be addressed as the counter 154 is incremented through $2^{n-1}$ counts. The output of the most significant stage then resets the single stage $B_2$ as the counter 154 recycles to zero to address the first of the even numbered lines. In that manner all lines of the field are read in odd and even groups for compatibility with the standard interlaced display of a television monitor 157.

As the data elements are read from the memory 152, they are converted into analog form by a digital to analog converter 158. The output of the converter drives a video amplifier 159 in the monitor. For synchronization, a horizontal and vertical sync generator 160 is connected to the outputs of the most significant bit positions of the counters 153 and 154. The connections may be through conventional RC coupling circuits at the inputs of the sync generator in order that horizontal and vertical sweep signals may be timed by the trailing edges of the outputs of the most significant bit positions of the counters 154 and 153, i.e. timed by when the outputs of the counters go to zero.

It is assumed that the sync generator 160 includes the sweep generators as represented by two control lines to the gun section of a cathode ray tube 161. In practice, the beam deflection circuit for the cathode ray tube is tuned to within about 5 percent of the display rate. The input signals to the sync generator 160 are then employed to provide fine tuning to the exact display rate set by the oscillator 156. Since standard monitors will have deflection circuits tuned to scan 525 lines at the rate of 15.75 K lines per second, the oscillator 156 may be set to run at about $15.75 \text{ K} \times 2^m$ Hz where each horizontal line displayed includes $2^m$ data elements, one data element from each of $2^m$ lines scanned by the radar.

The sync generator 160 is also connected to a blanking amplifier 162 to blank the video signal during line retrace and field retrace periods. Since a finite time is required for both line and field retrace, some data will be lost along the top and left side of the tube 161 as viewed by the observer. However, that data is from the fringes of the field being scanned by the radar and will not be significant if the field scanned is larger than is of actual interest.

To implement the bulk storage memory 152, a random access memory is preferred to allow the display to continue without interruption except when an element of data has been converted and stored in a buffer register. Thus the buffer memory 12 of FIG. 1 would be simply an output buffer register for the converter 11. As the display of elements proceeds, the scanning of range elements proceeds, but at a slower rate, thereby allowing the field data to be continually updated without initiation to the observer. Each RANGE pulse triggers a WRITE control signal generator 163 to produce a signal that initiates a write cycle for the memory 152 of suitable length after sufficient delay to allow the address selector 155 to settle at a new address specified by the counters 150 and 151 selected by AND gates, such as gate 165, connected directly to the WRITE control signal generator 163. At all other times, the address selector 155 selects addresses specified by counters 153 and 154 through AND gates, such as AND gate 166, connected to the WRITE control signal generator 163 via an inverter 167. OR gates, such as gate 168, connect whichever address is currently being selected for the memory 152.

While this orthogonal display technique may be readily used with standard television monitors for those situations where the scanned lines are to be displayed vertically, it can not be used for those situations where the scanned lines are to be displayed horizontally unless the counters 150 and 151 are interchanged in their connections to the address selector 155 to cause line blocks of data to be stored horizontally. That can be readily accomplished with mode control switches for a passing scene display, as opposed to a B scan display, for example, provided the counter is also converted from an up-down counter in the B scan mode to a normal (modulo M) binary counter which just counts up in the passing scene mode.

It should be appreciated that this technique for orthogonal read-write operation of a scan converter may be implemented in many different ways using many of the techniques described with reference to FIGS. 6 to 12. Each such implementation may be designed to take advantage of characteristics of the bulk storage memory selected, and designed to use a buffer memory of the type required to achieve the operating characteristics of the system ranging from a simple buffer register at the output of an analog-to-digital converter or the output of an element averaging system to a buffer memory capable of storing several line blocks of data and operating at a significantly higher speed than the bulk memory. All that is required is that the bulk storage memory look like a matrix for storing each line block of data in a separate column for all but the passing scene mode, one element per row, and vice versa for the passing scene mode, and for reading out rows of stored data in odd and even fields for display regardless of how the line blocks of data were stored in the matrix to complete a field. In that regard, it should be noted that the PPI scan data is stored in the same manner as B scan data and will therefore be displayed in the same manner as the B scan data. If a PPI display is desired, further conversion of the data will be required to cause the display of scanned lines to appear to converge at one point at the base of the television monitor.

While specific embodiments of the present invention have been disclosed using particular types of memories for various scanning patterns in converting slow data rates of radar scan patterns to high data rates for cathode ray tube display, it is recognized that different types of digital memories may be employed, and that the techniques may be used for still other scanning patterns, such as the C-scan which is like the B-scan, but employs azimuth and elevation as the scanning coordinates. The same techniques may also be used for other conversions, such as conversion of high data rates to low data rates, and regardless of the type of conversion being made, provision for color display may be made by suitable coding of data being transferred into the bulk memory. Accordingly, it is not intended that the scope of the invention be determined by the specific exemplary embodiments disclosed, but rather should be determined by the appended claims.

What is claimed is:

1. A digital scan converter comprising:
 sensing means for producing discrete video signals as a field of view is cyclically scanned in a predetermined pattern of successive lines at one particular rate;
 means for converting said video signals into elements of digital data, each element consisting of a binary number of k digits representative of the amplitude of a video signal where *k* is a constant integer;
 buffer storage means for receiving said elements of digital data and for storing a block therein said elements of digital data pertaining to a given line as a binary number;
 bulk storage means for receiving, from said buffer storage means in block form, said elements of digital data pertaining to said given line and for storing said data in a memory block preassigned to data pertaining to said given line;
 means for reading out data from said bulk storage means in a predetermined order bearing some relation to the order in which associated lines of said field are scanned for repeated display of all lines of said pattern at a rate which differs from said one particular rate;
 display means having an electron beam and a display surface responsive to said reading means for displaying said data by intensity modulating said beam in a frame with lines of displayed data spacially arranged relative to each other in the same sequence as scanned in said field;
 temporary means adapted to receive from said converting means said binary numbers and to store said binary numbers in proper sequence as microwords until transferred therefrom; and
 means for transferring said microwords to said block of said buffer storage means in groups, each group comprising a word, and said block consists of *n* words where *n* is a constant integer, and the product of the integers *k* and *n* is equal to the number of elements of digital data pertaining to a given line.

2. A digital scan converter as defined in claim 1 wherein said buffer storage means includes a number of blocks equal to less than the total number of lines scanned in said field of view during one scanning cycle, and sequencing means directing said words of successive lines scanned by said sensing means into successive ones of said blocks, and said blocks are selected to receive said words cyclically, said buffer storage means further comprising means for storing in association with each line block of *n* words an identifying number, where identifying numbers are assigned to lines scanned by said sensing means to correspond with addresses of memory blocks preassigned in said bulk storage means to respective line blocks of data, and said bulk storage means further comprises means responsive to said identifying number of a given line block of data for transferring out of said buffer memory said given line block of data stored therein into said bulk memory at a preassigned memory block.

3. A digital scan converter as defined in claim 2 wherein said display means is for the purpose of searching for targets in said field and said bulk storage means includes *n* memory blocks, where *n* is an arbitrary integer, in order to display *n* past histories for each line scanned, whereby said display means responds to said reading means to display *n* past frame histories with corresponding lines adjacent to each other for augmentation of target detection by display of a cluster of target indications for a true target video signal and display of random target indications for a false target video signal.

4. A digital scan converter as defined in claim 3 wherein said sensing means is adapted to search for targets in said field and said bulk storage means includes *n* memory cells for each digital data element of a line scanned, where *n* is an arbitrary integer specifying the number of binary digits of an intensity code stored for a given data element indicating a valid target sensed during the most recent scanning cycle, said intensity code calling for maximum intensity in said display means, wherein said bulk storage means includes means for altering the intensity code of a given stored data element in uniform stages each time the data element is updated following succeeding scanning cycles of said field by said sensing means and said sensing means produces no indication of a target, and wherein said display means includes means for providing a target indication in response to a given stored data element with an intensity specified by the intensity code thereof, whereby augmentation of target detection is provided by display of a trail of target indications with the most intense indication at the head thereof.

5. A digital scan converter comprising:
 sensing means for producing discrete video signals as a field of view is cyclically scanned in a predetermined pattern of successive lines at one particular rate, said predetermined scanning pattern having an arbitrary number of lines;
 means for converting said video signals into elements of digital data, each element consisting of a binary number of *k* digits representative of the amplitude of a video signal where k is a constant integer;
 buffer storage means for receiving said elements of digital data and for storing in a block therein said elements of digital data pertaining to a given line as a binary number;
 said buffer storage means including a predetermined number of memory blocks, said predetermined number being less than said arbitrary number, sequencing means for storing successive line blocks of data in different memory blocks, and means for storing for each line block of data a unique number associated therewith, said number corresponding to the address of a preassigned memory block in said bulk storage means;
 bulk storage means for receiving from said buffer storage means in block form, said elements of digital data pertaining to said given line and for storing said data in a memory block preassigned to data pertaining to said given line;
 said bulk storage means including means for cyclically addressing memory blocks therein in a predetermined order, means for comparing the address of each memory block with unique numbers stored in said buffer storage means, and means responsive to said comparing means for transferring a line block of data from said buffer storage means into a memory block in said bulk storage means having an address that is the same as the unique number associated therewith and stored in said buffer storage means;

means for reading out data from said bulk storage means in a predetermined order bearing some relation to the order in which associated lines of said field are scanned for repeated display of all lines of said pattern at a rate which differs from said one particular rate; and display means having an electron beam and a display surface responsive to said reading means for displaying said data by intensity modulating said beam in a frame with lines of displayed data spacially arranged relative to each other in the same sequence as scanned in said field.

6. A digital scan converter comprising:

sensing means for producing discrete video signals at one particular rate as a field of view is repeatedly scanned back and forth in a predetermined pattern of successive lines, said lines being arbitrarily numbered in sequence from one side of said field to the other;

means for converting said video signals into elements of digital data;

bulk storage means for storing blocks of digital data, each block pertaining to a given line of said field being assigned to a memory location having an address number which corresponds to the number of said given line in said field;

means for cyclically reading out line blocks of data from memory locations in said bulk storage means;

display means responsive to said reading means for displaying said line blocks of data in a frame with lines of displayed data spacially arranged relative to each other in the same manner as the corresponding lines in said field;

buffer storage means for receiving said elements of digital data and for storing in blocks therein line blocks of data, each line block of data being stored therein until said reading means address a memory location to which assigned; and means for transferring from said buffer storage means to said bulk storage means a block of line data when a memory area to which assigned is addressed by said reading means.

7. A digital scan converter as defined in claim 6 wherein said buffer storage means includes means for storing for each line block of data a number assigned to the scanning line from which derived, and said transferring means includes means for comparing the addresses of memory locations as they are read with line numbers stored in said buffer storage means.

8. A digital scan converter as defined in claim 7 wherein said means for storing line numbers comprises a number of discrete registers, each adapted to store the line number of a line block of data stored in said buffer storage means, and wherein said buffer storage means comprises a number of blocks of memory corresponding to said number of discrete registers, each register being associated with a block of memory in said buffer storage means to identify the block of memory from which a line block of data is to be transferred to said bulk storage means in response to said transferring means.

9. A digital scan converter as defined in claim 8 including:

means for cyclically selecting said discrete registers in response to said sensing means, a succeeding one being selected at the start of each line scan; and means responsive to said cyclical selecting means for addressing said buffer storage means to store in an associated block of memory a line block of data derived from a line being scanned.

10. A digital scan converter as defined in claim 8 wherein said comparing means comprises a plurality of comparators, one for each discrete register adapted to compare the address of a given memory area to be read next by said reading means with the contents thereof and, in response to a comparison therewith, causing said transferring means to transfer a line block of data from the associated block of memory in said buffer storage means to said given memory location.

11. A digital scan converter comprising:

sensing means for producing video signals at a particular rate as a field of view is scanned in a predetermined pattern of successive lines;

means for converting said video signals into elements of digital data including means for averaging n successive video returns into one element of digital data where $n$ is an arbitrary integer;

means controlling said sensing means to produce $n$ times as many video signals for a given line scanned as are converted into elements of digital data means for receiving said elements of digital data in sequence and for storing said data received for retrieval in a predetermined order related to the order in which the corresponding line of said field was scanned;

means for cyclically reading out line blocks of data from said means for storing in said predetermined order; and display means responsive to said reading means for displaying said line blocks of data in a frame at a rate independent of said particular rate with lines of displayed data spacially arranged relative to each other in the same sequence as scanned in said field.

12. A digital scan converter comprising:

sensing means for producing discrete video signals as a line of view is repeatedly scanned at one particular rate, where said sensing means is being transported in a direction substantially at right angle to said line of view to scan a passing scene;

means for converting said video signals into quantized elements of digital data, each element consisting of a binary number of $k$ digits representative of the amplitude of a video signal, where $k$ is a constant integer;

means adapted to receive from said converting means said binary numbers and to store said binary numbers in proper sequence as microwords until transferred therefrom;

means for transferring said microwords to said block of storage means in groups, each group comprising a word, and said block consists of $n$ words, where $n$ is a constant integer, and the product of the integers $k$ and $n$ is equal to the number of elements of digital data pertaining to a given line;

storage means for receiving said elements of digital data and for storing data from a given line in a memory block preassigned to one of a given number of memory locations;

means for reading out line blocks of data from said means in a predetermined order bearing some relation to the order in which stored for repeated display of all lines of data stored in said given number of memory locations at a rate which differs from said one particular rate such that all lines are displayed in one frame for viewing in a spacial relationship corresponding to lines of view scanned to obtain corresponding line blocks of data with the line block of data of the most recently scanned line of view read for display first during each frame display cycle, and stored line blocks of data of all other scanned lines of view read for display with data of the more recently scanned line read next in sequence; and display means responsive to said means for reading out for displaying said line blocks of data in a frame.

13. A digital scan converter as defined in claim 12 wherein said storage means further includes a buffer storage means and a bulk storage means, said buffer storage means comprising a number of blocks equal to less than the total number of lines stored in said bulk storage means for display in one frame, sequencing means directing said words of successive lines scanned by said sensing means into sccessive ones of said blocks, said blocks being selected to receive said words cyclically, said buffer storage means further comprising means for storing in association with each line block of n words an identifying number, where identifying numbers are assigned to lines scanned by said sensing means to correspond with addresses of memory blocks preassigned in said bulk storage means to respective line blocks of data, and said bulk storage means comprises means for reading out of said buffer storage means a given line block of data stored therein for transfer to said bulk storage means when the address of a memory block to be read out of said bulk storage means to said display means compares with an identifying number stored in said buffer storage means associated with said given line block of data.

14. A digital scan converter as defined in claim 13 wherein said identifying number is assigned to each line block of data by a counter driven by a signal source having a frequency proportional to the velocity at which said scanning means is viewing a passing scene.

15. A digital scan converter as defined in claim 14 wherein said sensing means is operated to produce $n$ times as many video signals for a given line scanned as are converted into elements of digital data, where $n$ is an arbitrary integer, and said means for converting said video signals into elements of digital data includes means for averaging $n$ successive video returns into one element of digital data.

16. A digital scan converter as defined in claim 15 wherein said sensing means is operated to scan m times as many lines as are to be stored in said bulk storage means for display, where $m$ is an arbitrary integer, and said buffer storage means includes means for averaging $m$ successive lines by averaging corresponding elements of said $m$ lines.

17. A digital scan converter comprising:

sensing means for producing discrete video signals as a field of view is cyclically scanned in a predetermined pattern of successive planes at one particular rate, each plane comprising a predetermined number of scanned lines;

means for converting said video signals into elements of digital data;

buffer storage means having a plurality of memory blocks for receiving said elements of digital data and for storing each line block of data in a block therein said elements of digital data pertaining to a given line of a given plane;

bulk storage means for receiving, from said buffer storage means in block form, said elements of digital data pertaining to said given line of said given plane, and for storing said data in each line block of data in a memory block, each memory block being preassigned to data pertaining to a given line of said given plane;

means for reading out line blocks of data from said bulk storage means in a predetermined order bearing some relation to the order in which associated lines of said given plane are scanned with corresponding lines of all other planes interlaced with lines of said given plane, for repeated display of all lines of selected planes of said pattern at a rate which differs from said one particular rate;

means for selecting planes of said pattern for display; and display means responsive to said selecting means for displaying line blocks of data from selected planes in a frame with lines of displayed data from a given plane spacially arranged relative to each other in the same sequence as scanned in said field.

18. A digital scan converter as defined by claim 17 wherein said selecting means is adapted to select all planes for simultaneous display in order to monitor the entire field, and to select one plane in order to concentrate on video signals stored for display from just one plane.

19. A digital scan converter as defined by claim 18 wherein said bulk storage means includes n memory blocks for each plane, where $n$ is an arbitrary integer, in order to display n past histories for each line, whereby said display means responds to said reading means to display n past frame histories with corresponding lines adjacent to each other for augmentation of target detection by display of a cluster of target indications for a true target video signal and display of random target indications for a false target video signal.

20. A digital scan converter as defined in claim 18 wherein said storage means includes $n$ memory cells for each digital data element of a line scanned in a given plane, where $n$ is an arbitrary integer specifying the number of binary digits of an intensity code stored for a given data element indicating a valid target sensed during the most recent scanning cycle of said pattern, said intensity code calling for maximum intensity in said display means, and wherein said storage means includes means for altering the intensity code of a given stored data element in uniform stages each time the data element is updated following succeeding scanning cycles of said pattern by said sensing means and said sensing means produces no indication of a target, and wherein said display means includes means for providing a target indication in response to a given stored data element with an intensity specified by the intensity code thereof, whereby augmentation of target detection is provided by display of a trail of target indications with the most intense indication at the head thereof.

21. A digital scan converter comprising:
sensing means for producing discrete video signals as a field of view is cyclically scanned in a predetermined pattern of successive lines;
means for converting said video signals into elements of digital data, each element representing at least one video signal of at least one line;
$m$ memory blocks, for storing said elements of digital data, one for each of said lines scanned by said sensing means, and said blocks are assigned $m$ successive address numbers, each of said blocks comprising $n$ memory locations, one memory location for each of said elements of digital data, and said locations are assigned $n$ successive address numbers;
means for addressing successive locations of a given block by a composite address of $m$ and $n$ binary digits, where the binary value of said $n$ binary digits is incremented by for each element to be stored;
means for altering the value of said m binary digits by one as the scanning of the next line is initiated by said sensing means as said lines are continuously scanned by said sensing means;
means for reading out data from said memory blocks in a predetermined order for repeated display of all lines of said pattern by reading out corresponding elements of digital data from all lines in repeated sequences, each sequence starting with one line at one side of said pattern and concluding with one line at a side opposite said one side of said pattern; and
display means responsive to said reading means for displaying said data in a frame with lines of displayed data spacially arranged relative to each other in the same sequence as scanned in said field, and orthogonally positioned relative to the direction in which a sequence of corresponding elements are displayed as read out of said storage means by said reading means.

22. A digital scan converter as defined in claim 21 wherein said means for reading out data from said memory blocks comprises:
a source of a signal alternating at a substantially constant frequency; and
first and second counting means driven in cascade by said signal, said first counting means providing $m$ address digits of a composite address, and said second counting means providing $n$ address digits of said composite address, where $m$ and $n$ digits have the same address connotations as in said storage means.

23. A digital scan converter as defined in claim 22 wherein said second counting means comprises a first binary counter having $n-k$ stages and a second binary counter having $k$ stages connected in cascade with said first binary counter but arranged to provide the least significant $k$ digits of said $n$ address digits, whereby all elements of all lines are read for display in $2^k$ interlaced fields of $2^{n-k}$ lines per field.

24. A digital scan converter as defined in claim 23 wherein $k$ is equal to 1.

25. In a data display system, the combination comprising:
sensing means for producing discrete video signals as a field of view is cyclically scanned in a predetermined pattern of successive lines;
means connected to receive said discrete video signals and for threshold detecting the amplitude of each discrete video signal for determining the presence of a target, thereby producing a succession of detector output signals as said sensing means scans, one detector output signal for each video signal in as said sensing means scans a given line;
means for encoding each detector output signal indicating the presence of a target as a number of predetermined maximum value, and for storing the resulting maximum value code as datum of the most recent scanning cycle;
means for altering the value code of each datum stored during successive scanning cycles to lower the numerical values thereof in equal increments when corresponding detector output signals do not indicate the presence of a target until a predetermined minimum value is reached; and
means for displaying data stored with lines of displayed data spatially arranged relative to each other in the same sequence as scanned by said scanning means, each datum being displayed with an intensity proportional to its current value code, whereby display of a moving target is augmented by having a datum representing a target from the most recent scanning cycle displayed with maximum intensity followed by a trail of displayed data, each datum of said trail being of successively less intensity in a direction away from the datum of maximum intensity.

26. In a digital scan converter adapted to receive a field of data elements, said elements representing quantized video signals received from a sensor in sequence as said sensor scans a field of view in substantially parallel lines, and adapted to transmit said field of data elements to a utilization device, the combination comprising:
means for grouping a predetermined number of said elements into line blocks of data, one line block for each of said parallel lines scanned; and
means for averaging a predetermined number of successive line blocks of data grouped for transmittal to said utilization device, whereby fewer lines of data are transmitted to said utilization device than are received by said scan converter.

27. In a digital scan converter adapted to receive a field of data elements, said elements representing quantized video signals recieved form a sensor in sequence as said sensor scans a field of view in substantially parallel lines, and adapted to transmit said field of data elements to a utilization device, the combination comprising:
means for averaging a predetermined number of successive elements of data into new elements; and
means for grouping a predetermined number of said new elements into line blocks of data, one line block for each of said parallel lines scanned, whereby fewer elements of data are transmitted to said utilization device for each line block of data than are received by said scan converter.

28. In a digital scan converter as defined in claim 27 including means for averaging a predetermined number of successive line blocks of data grouped for transmittal to said utilization device, whereby fewer lines of data are transmitted to said utilization device than are received by said scan converter.

* * * * *

Disclaimer 3,810,174.—*James L. Heard*, and *William C. Hoffman*, Torrance, and *Eugene W. Opittek*, Tustin, Calif. DIGITAL SCAN CONVERTER. Patent dated May 7, 1974. Disclaimer filed Mar. 9, 1981, by the assignee, *Hughes Aircraft Co.*

Hereby enters this disclaimer to claims 1 through 28 of said patent.

[*Official Gazette November 24, 1981.*]